United States Patent
Haltom

(10) Patent No.: US 11,554,748 B2
(45) Date of Patent: Jan. 17, 2023

(54) METHODS AND APPARATUS FOR IMPLEMENTING AN EXTERNAL AIRBAG

(71) Applicant: Nuro, Inc., Mountain View, CA (US)

(72) Inventor: Marshall Dickens Haltom, San Francisco, CA (US)

(73) Assignee: NURO, INC, Mountain View, CA (US)

( * ) Notice: Subject to any disclaimer, the term of this patent is extended or adjusted under 35 U.S.C. 154(b) by 0 days.

(21) Appl. No.: 17/462,252

(22) Filed: Aug. 31, 2021

(65) Prior Publication Data

US 2022/0063551 A1 Mar. 3, 2022

Related U.S. Application Data

(60) Provisional application No. 63/074,348, filed on Sep. 3, 2020.

(51) Int. Cl.
*B60R 21/36* (2011.01)
*B60R 21/34* (2011.01)

(52) U.S. Cl.
CPC ........ *B60R 21/36* (2013.01); *B60R 2021/343* (2013.01)

(58) Field of Classification Search
CPC .... B60R 21/34; B60R 21/36; B60R 2021/343
See application file for complete search history.

(56) References Cited

U.S. PATENT DOCUMENTS

| | | |
|---|---|---|
| 7,036,844 B2 | 5/2006 | Hammer et al. |
| 9,802,568 B1 | 10/2017 | Larner |
| 10,029,638 B1 | 7/2018 | Lombrozo et al. |
| 10,106,124 B1 | 10/2018 | Larner et al. |
| 10,336,290 B1 * | 7/2019 | Lazaro ................... B60R 21/36 |
| 10,824,862 B2 | 11/2020 | Qi et al. |
| 10,882,488 B2 * | 1/2021 | Ferguson ............. G05D 1/0033 |

(Continued)

FOREIGN PATENT DOCUMENTS

| | | |
|---|---|---|
| CN | 1730318 A | 2/2006 |
| CN | 101743151 B | 6/2010 |

(Continued)

OTHER PUBLICATIONS

International Search Report and Written Opinion in counterpart International Application No. PCT/US2021/048351, dated Dec. 20, 2021, 11 pages.

*Primary Examiner* — Barry Gooden, Jr.
(74) *Attorney, Agent, or Firm* — Edell, Shapiro & Finnan, LLC

(57) ABSTRACT

According to one aspect, a system that supports an undeployed airbag is arranged to enable the airbag to be substantially cradled while undeployed, and to enable the airbag to be deployed in a manner that substantially protects a vehicle panel positioned over the airbag from being severely damaged when the airbag deploys. Such a system may enable the undeployed airbag to be attached to the vehicle panel such that the panel may deform upon deployment of the airbag to substantially absorb some deployment energy. The absorption of some deployment energy may effectively reduce the likelihood of a person being injured, or an object being severely damaged, upon contact with a deploying or deployed airbag.

20 Claims, 24 Drawing Sheets

(56) References Cited

U.S. PATENT DOCUMENTS

| | | | |
|---|---|---|---|
| 2003/0062208 A1* | 4/2003 | Hamada | B60R 21/36 180/274 |
| 2004/0074688 A1 | 4/2004 | Hashimoto et al. | |
| 2005/0206139 A1* | 9/2005 | Mori | B60R 21/36 180/274 |
| 2008/0202839 A1* | 8/2008 | Satou | B60R 21/36 180/274 |
| 2009/0066069 A1* | 3/2009 | Takahashi | B60R 21/36 280/743.1 |
| 2009/0084620 A1* | 4/2009 | Matsuura | F15B 15/22 180/69.2 |
| 2009/0229906 A1* | 9/2009 | Takahashi | B60R 21/36 180/274 |
| 2009/0242308 A1 | 10/2009 | Kitte et al. | |
| 2010/0052294 A1 | 3/2010 | Kim et al. | |
| 2010/0084426 A1 | 4/2010 | Devers et al. | |
| 2010/0148476 A1* | 6/2010 | Inoue | B60R 21/36 280/728.2 |
| 2010/0156070 A1* | 6/2010 | Takahashi | B60R 21/36 280/728.3 |
| 2010/0230944 A1* | 9/2010 | Narita | B60R 21/36 280/741 |
| 2010/0244413 A1* | 9/2010 | Hayashi | B60R 21/36 280/728.3 |
| 2010/0252350 A1* | 10/2010 | Hayashi | B60R 21/36 180/274 |
| 2010/0252351 A1* | 10/2010 | Okamoto | B60R 21/36 180/274 |
| 2010/0269730 A1 | 10/2010 | Horlacher | |
| 2013/0119681 A1 | 5/2013 | Mendis et al. | |
| 2014/0081445 A1 | 3/2014 | Villamar | |
| 2014/0087126 A1 | 3/2014 | Quaderer | |
| 2015/0000994 A1 | 1/2015 | McLundie | |
| 2015/0006005 A1 | 1/2015 | Yu et al. | |
| 2015/0008064 A1 | 1/2015 | Park | |
| 2015/0137492 A1 | 5/2015 | Rao et al. | |
| 2015/0336524 A1 | 11/2015 | Larner et al. | |
| 2015/0367799 A1 | 12/2015 | Le et al. | |
| 2016/0200286 A1* | 7/2016 | Farrington | B60R 21/38 180/274 |
| 2016/0207495 A1 | 7/2016 | Le et al. | |
| 2016/0264087 A1 | 9/2016 | Ohmura | |
| 2016/0355152 A1* | 12/2016 | Perez Garcia | B60R 21/233 |
| 2017/0113641 A1 | 4/2017 | Thieberger et al. | |
| 2017/0174343 A1 | 6/2017 | Erickson et al. | |
| 2018/0162316 A1* | 6/2018 | Saito | B60R 21/21 |
| 2019/0001919 A1 | 1/2019 | Farooq et al. | |
| 2019/0054876 A1 | 2/2019 | Ferguson et al. | |
| 2020/0172041 A1* | 6/2020 | Dix | B60R 21/235 |
| 2021/0229622 A1* | 7/2021 | Baccouche | B60R 19/42 |
| 2021/0229623 A1 | 7/2021 | Kwon | |
| 2021/0245701 A1* | 8/2021 | Haltom | B60R 21/0134 |

FOREIGN PATENT DOCUMENTS

| | | |
|---|---|---|
| CN | 102781731 B | 11/2012 |
| CN | 109278696 B | 1/2019 |
| EP | 0958969 B1 | 8/2003 |
| EP | 958969 B1 | 8/2003 |
| EP | 1652740 A2 | 5/2006 |
| GB | 2344080 A | 5/2000 |
| JP | H06189610 A | 7/1994 |
| JP | 2006240351 A | 9/2006 |
| WO | 2008062128 A1 | 5/2008 |
| WO | 2017072679 A1 | 5/2017 |

* cited by examiner

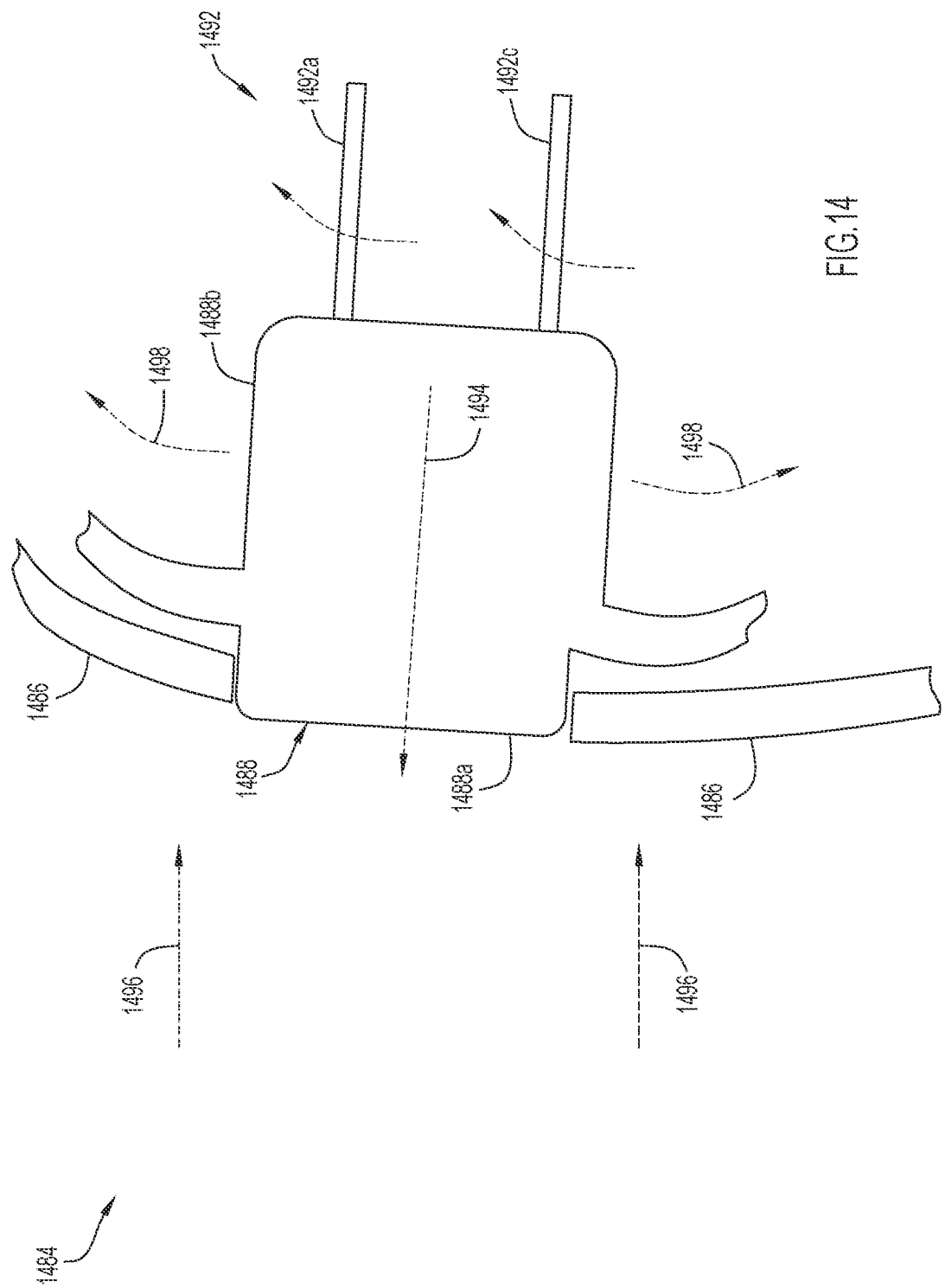

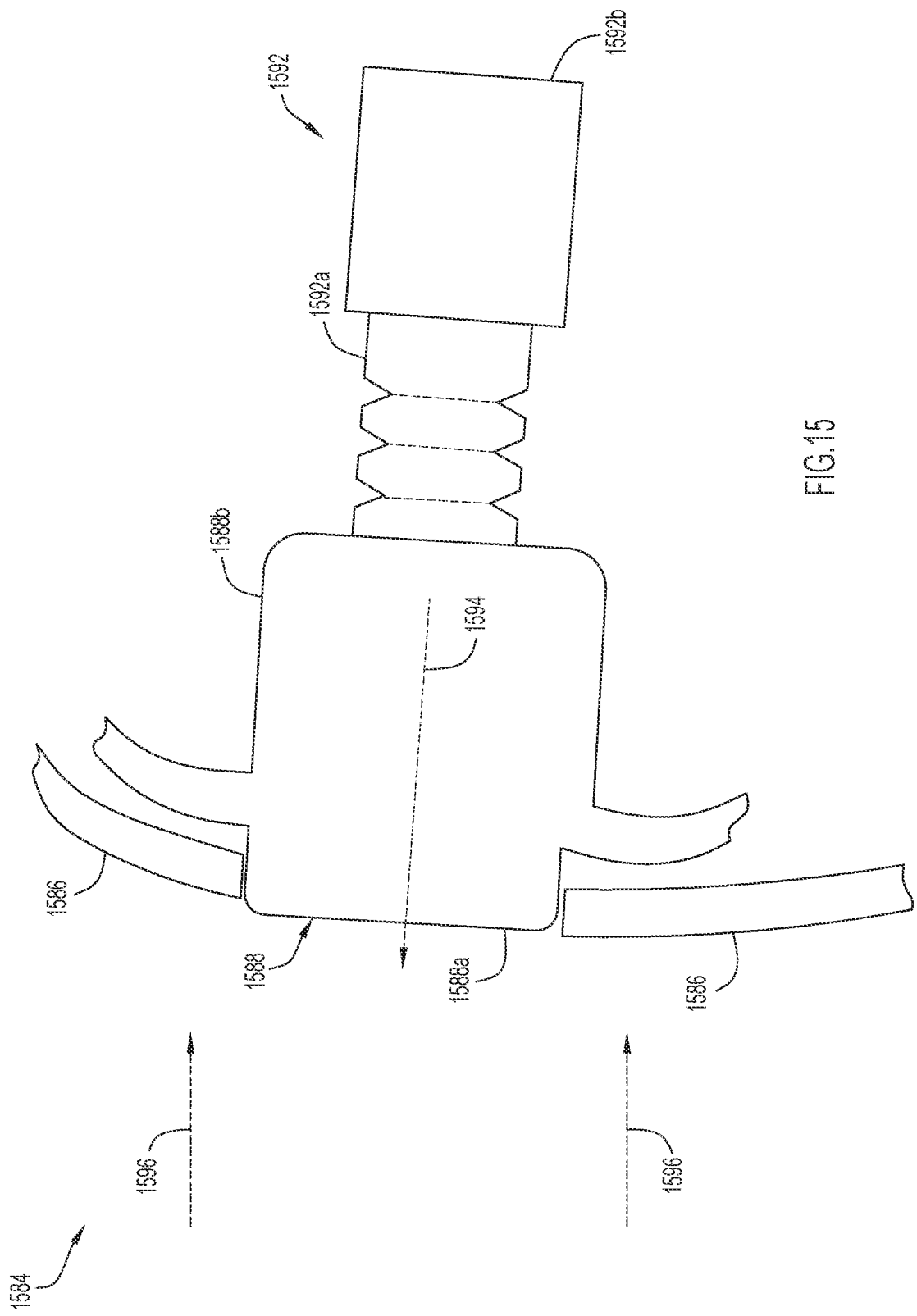

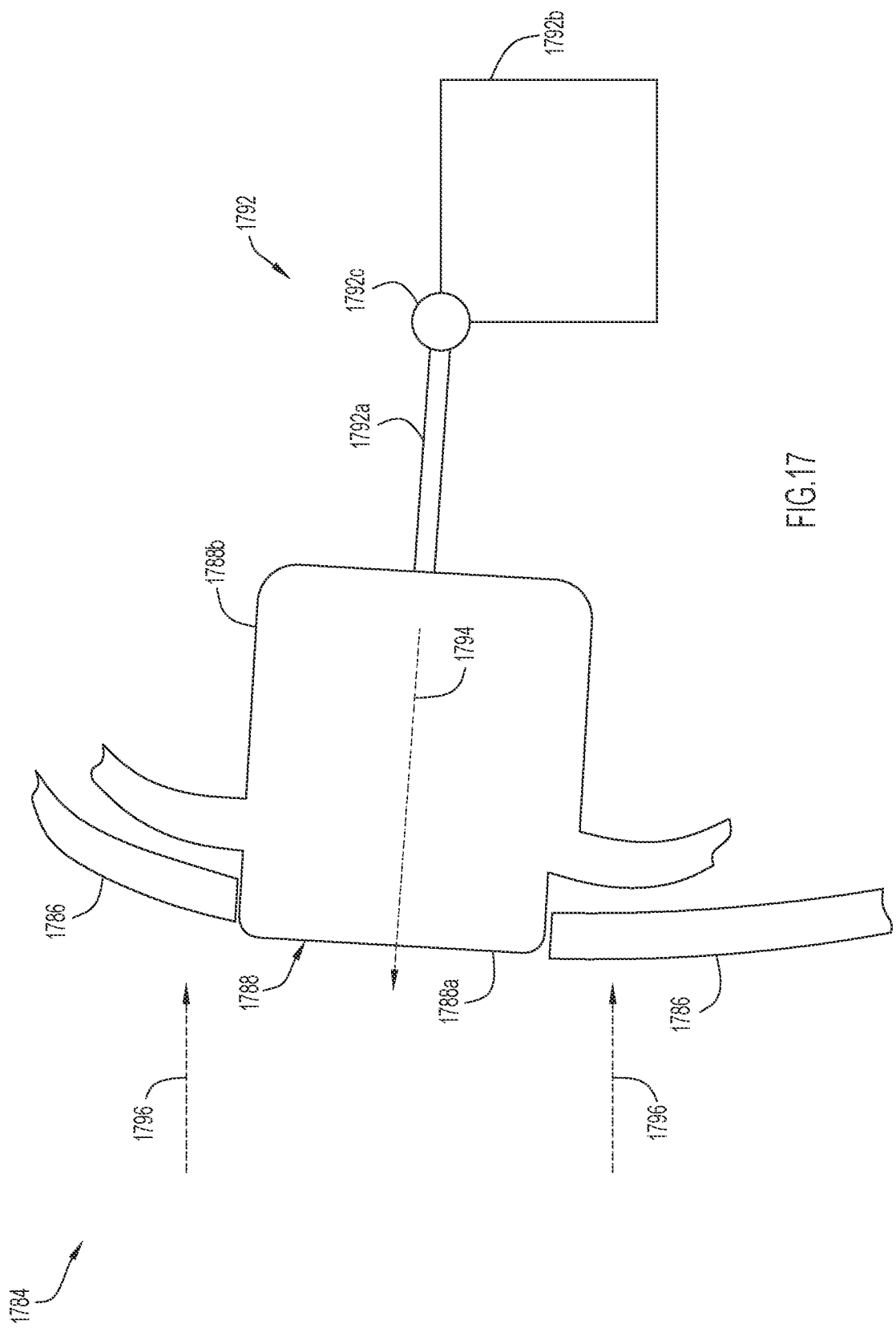

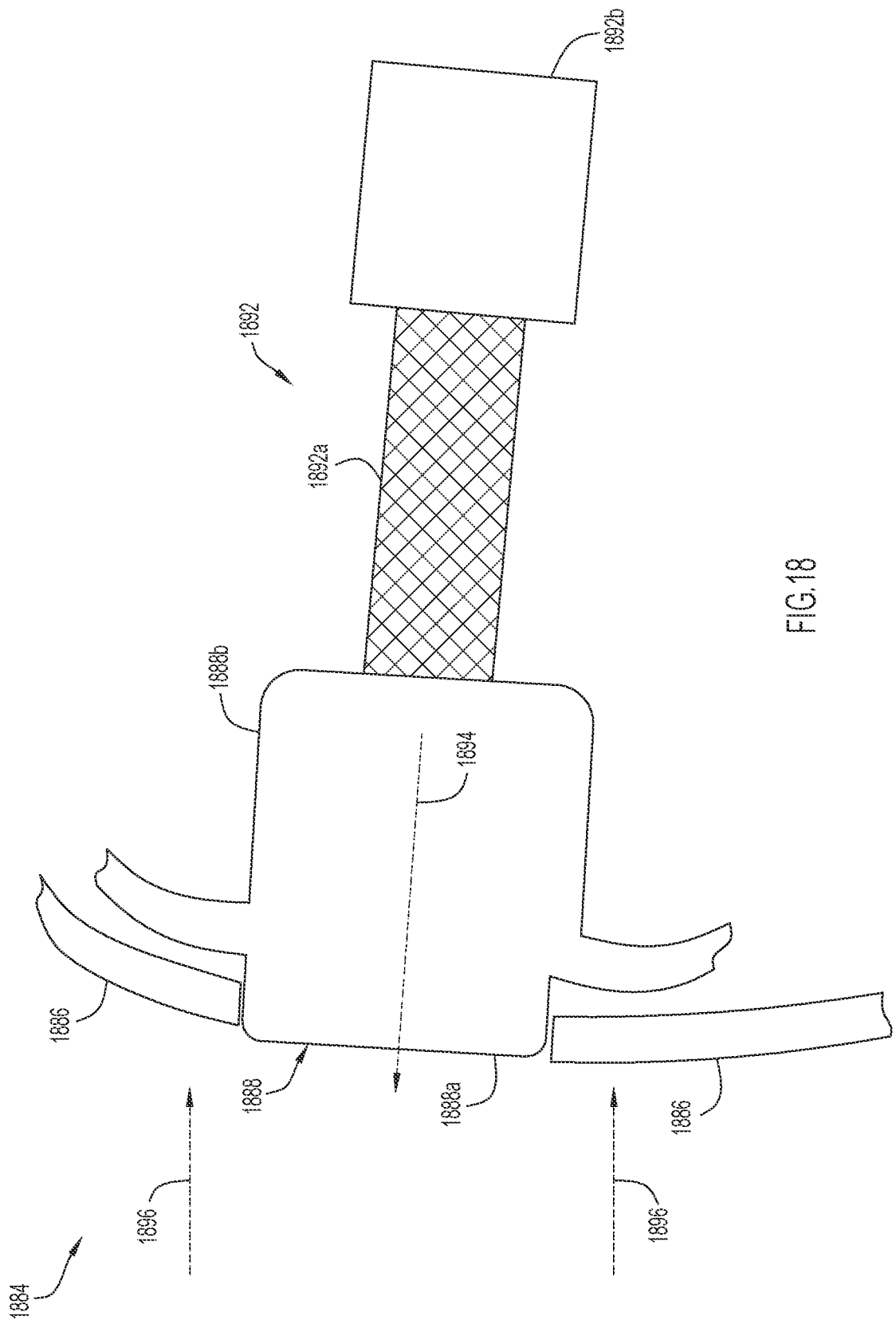

METHODS AND APPARATUS FOR IMPLEMENTING AN EXTERNAL AIRBAG

PRIORITY CLAIM

This application claims the benefit of priority under 35 U.S.C. § 119 to U.S. Provisional Application No. 63/074,348, entitled "METHODS AND APPARATUS FOR IMPLEMENTING AN EXTERNAL AIRBAG," filed on Sep. 3, 2020, the entirety of which is incorporated herein by reference.

TECHNICAL FIELD

The disclosure relates to providing safety mechanisms for vehicles to protect pedestrians. More particularly, the disclosure relates to providing external airbags for autonomous vehicles.

BACKGROUND

Vehicles are often faced with obstacles as the vehicles navigate roads. Obstacles generally include pedestrians who may choose to cross into the path of a vehicle without regard for their own safety. The ability for vehicles such as autonomous vehicles to avoid collisions with obstacles is crucial to protect pedestrians. However, there may be unavoidable collisions that may arise when an autonomous vehicle may not reasonably avoid impact with a pedestrian. In such cases, the ability to protect a pedestrian as much as possible during a collision is critical.

BRIEF DESCRIPTION OF THE DRAWINGS

The disclosure will be readily understood by the following detailed description in conjunction with the accompanying drawings in which:

FIG. 14 is a diagrammatic side-view cross-sectional representation of an airbag mounting configuration for an autonomous vehicle that includes a compliance arrangement including at least one compliance component in accordance with an embodiment.

FIG. 15 is a diagrammatic side-view cross-sectional representation of an airbag mounting configuration for an autonomous vehicle that includes a compliance arrangement in which a compliance component is a tube component with cuts to support buckling of the tubing in accordance with an embodiment.

FIG. 17 is a diagrammatic side-view cross-sectional representation of an airbag mounting configuration that includes a compliance arrangement including at least one compliance component that is a fold point component in accordance with an embodiment.

FIG. 18 is a diagrammatic side-view cross-sectional representation of an airbag mounting configuration for an autonomous vehicle that includes a compliance arrangement including a compliance component that is a strain-supporting component in accordance with an embodiment.

DESCRIPTION OF EXAMPLE EMBODIMENTS

Overview

Figure 1:
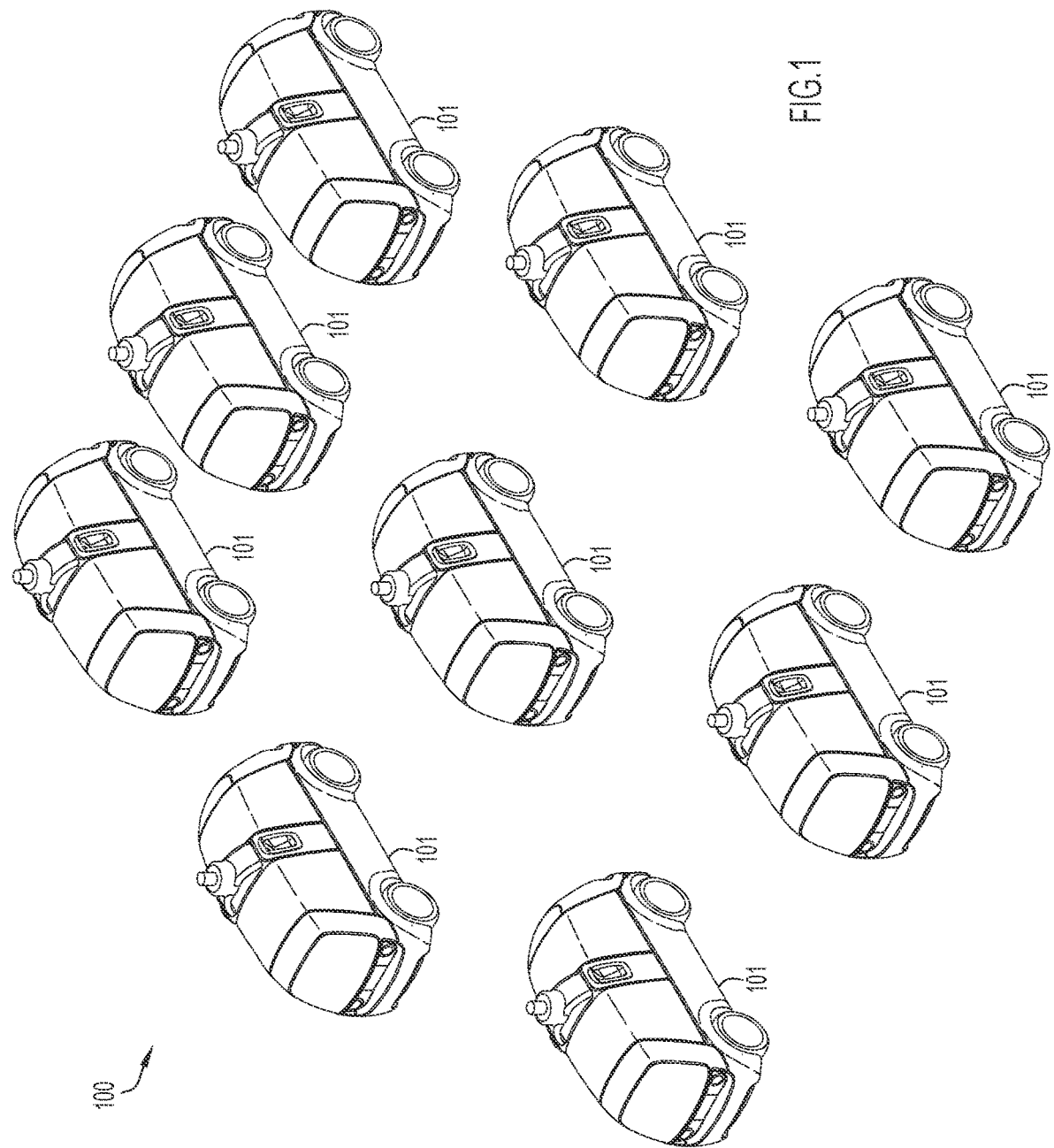
FIG. 1 is a diagrammatic representation of an autonomous vehicle fleet, according to an example embodiment.

In one embodiment, a system that supports one or more undeployed airbag(s) is arranged to enable the airbag(s) to be substantially cradled while undeployed, and to enable the airbag(s) to be deployed external to the vehicle in a manner that substantially protects a vehicle panel positioned over the airbag(s) from being severely damaged when the airbag(s) is/are deployed external to the vehicle. Such a system may enable the undeployed airbag(s) to be attached to the vehicle panel such that the panel may deform upon deployment of the airbag(s) to substantially absorb some deployment energy. The absorption of some deployment energy may effectively reduce the likelihood of a person being injured, or an object being severely damaged, upon contact with airbag(s) that may be partially (e.g., in the process of being deployed) or fully deployed. In addition to cushioning impact during a collision, the deployment of one or more external airbag(s) may also control kinematics of vulnerable person, for example, to address potential brain injuries in persons due to rotational kinematics.

For example, in one embodiment, a vehicle is provided that may include an external panel comprising an internal side and an external side, wherein the internal side faces towards an interior of the vehicle and the external side faces away from the interior of the vehicle and wherein the front panel is formed of a deformable material; a cradle, wherein the cradle comprises a cover portion and a bucket portion and the cradle interfaces, at least in part, along the internal side of the external panel; and at least one airbag, wherein the bucket portion of the cradle supports the airbag.

In another embodiment, an airbag mounting configuration is provided that may include a panel comprising an internal side and an external side, wherein the internal side faces towards an interior of an apparatus to which the panel is affixed and the external side faces away from the interior of the apparatus and wherein the panel is formed of a deformable material; a cradle, wherein the cradle comprises a cover portion and a bucket portion and interfaces, at least in part, along the internal side of the panel; and at least one airbag, wherein the bucket portion of the cradle supports the at least one airbag.

In yet another embodiment, a vehicle is provided that may include a panel comprising an internal side and an external side, wherein the internal side faces towards an interior of an apparatus to which the panel is affixed and the external side faces away from the interior of the apparatus and wherein the panel is formed of a deformable material; and an airbag cradle arrangement comprising: a cradle, wherein the cradle comprises a cover portion and a bucket portion; a bracket or coupling arrangement that attaches the cradle to the panel, wherein a gap is provided between the cover portion and the bucket portion of the cradle via the coupling or bracket arrangement to allow the cover portion to move independent of the bucket portion; and at least one airbag, wherein the bucket portion of the cradle supports the at least one airbag.

DETAILED DESCRIPTION

As vehicles such as autonomous vehicles navigate roadways, the vehicles may encounter vulnerable persons, such as pedestrians or cyclists (e.g., bicyclists, motorcyclists, etc.). The ability to reduce the chances that a vulnerable person suffers a significant injury in the event of a collision between a vehicle and the vulnerable person is critical.

By deploying one or more external airbag(s) intended to cushion impact when a vehicle collides with a vulnerable person, the injury outcomes of the vulnerable person may be improved. In one embodiment, one or more external airbag(s) may be located about an exterior of a vehicle, and may be selectively deployed depending upon the characteristics of a vulnerable person or an object with which the vehicle is either about to collide or is in the process of colliding. For example, for a pedestrian or object that is determined to satisfy (e.g., meet or exceed) a certain height threshold or threshold range, one deployed external airbag may cushion a large portion of the pedestrian (e.g., abdomen, and potentially head for average height pedestrians) or object. In some instances, satisfying a certain height threshold or threshold range may cause to be deployed one external airbag that may cushion a mid-portion of the pedestrian (e.g., abdomen) or object and may cause to be deployed one or more other external airbags that may cushion upper and/or lower extremities of the pedestrian or object.

As referred to herein, the term "external airbag" may include any airbag can be configured for/integrated onto/into an exterior of an autonomous vehicle and that can be deployed along one or more exterior portions of the autonomous vehicle.

Example embodiments that may be used to implement the features and functionality of this disclosure will now be described with more particular reference to the accompanying figures. When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate," etc.) should be understood as indicating values very near to those that accompany the aforementioned term. That is to say, a deviation within reasonable limits from an exact value should be accepted because a skilled person in the art will understand that such a deviation from the values indicated is inevitable due to measurement inaccuracies, etc. The same applies to the terms "about" and "around" and "substantially." Similarly, when used herein, the term "comprises" and its derivations (such as "comprising," etc.) should not be understood in an excluding sense, that is, these terms should not be interpreted as excluding the possibility that what is described and defined may include further elements, steps, etc. Further, each example embodiment is described herein as illustrative and is not to be construed as a preferred or advantageous embodiment, but rather as one example or illustration of a possible embodiment.

For example embodiments discussed herein, reference may be made to the spatial relationships between various components and to the spatial orientation of various aspects of components as depicted in the attached drawings. However, as will be recognized by those skilled in the art, the devices, components, members, apparatuses, etc. described herein may be positioned in any desired orientation. Thus, the use of terms such as "above," "below," "upper," "lower," "top," "bottom," and/or any other similar terms that can be used to describe spatial relationships between various components or to describe the spatial orientation of aspects of such components, should be understood to describe a relative relationship between the components or a spatial orientation of aspects of such components, respectively, as the components described herein may be oriented in any desired direction.

Multiple airbags may be positioned on exteriors of autonomous vehicles that are part of a vehicle fleet. Referring initially to FIG. 1, an autonomous vehicle fleet 100 will be described according to an example embodiment. The autonomous vehicle fleet 100 includes a plurality of autonomous vehicles 101, or robot vehicles. Autonomous vehicles 101 are manned or unmanned mobile machines that are generally arranged to transport and/or to deliver people, cargo, items, and/or goods, whether on land or water, air, or another surface, such as a car, wagon, van, tricycle, truck, bus, trailer, train, tram, ship, boat, ferry, drove, hovercraft, aircraft, spaceship, etc.

Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

As will be discussed in more detail below, each autonomous vehicle 101 may include a power system, a propulsion or conveyance system, a navigation system, a control system or controller, a communications system, one or more processor(s), a sensor system and, in some instances, one or more database(s) (and/or any other memory element(s)).

Figure 2:
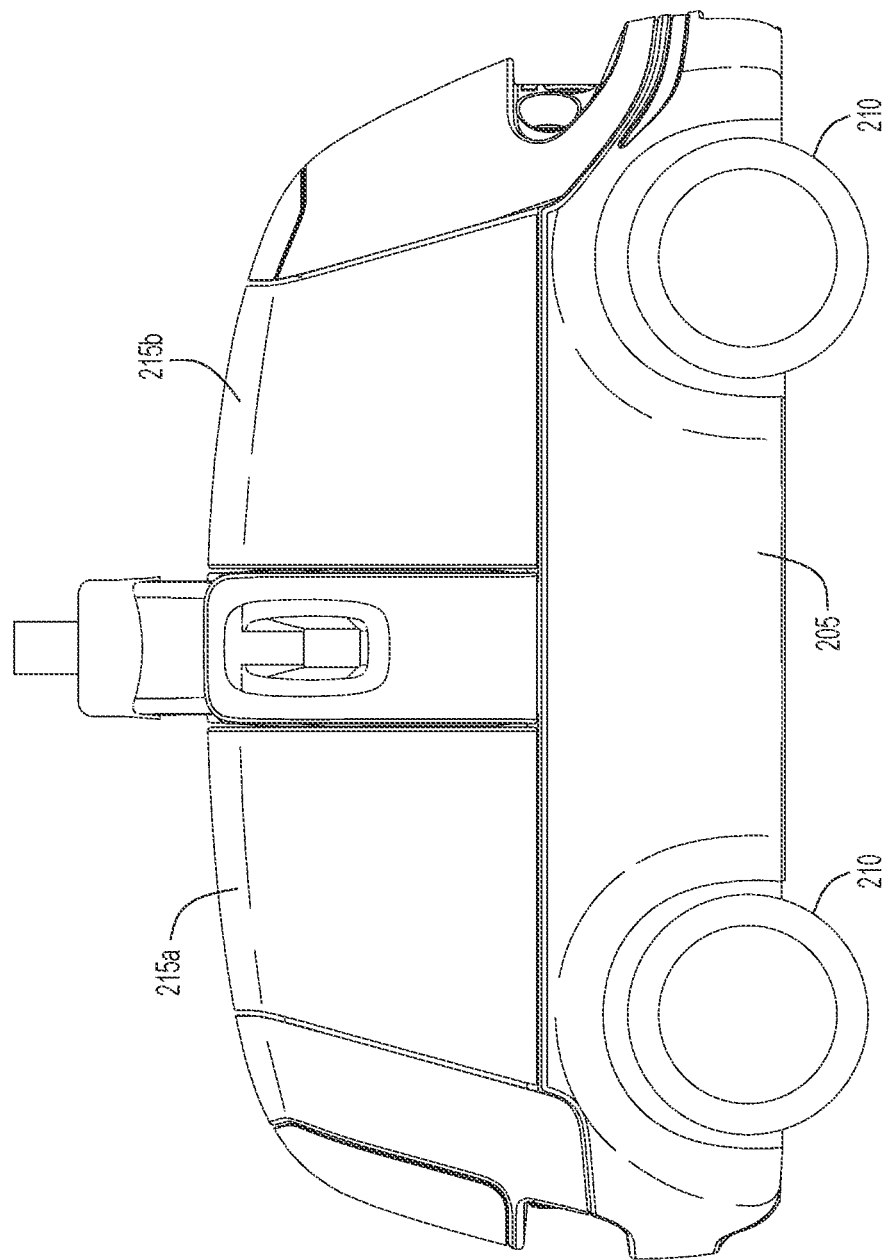
FIG. 2 is a diagrammatic representation of a side of an autonomous vehicle, according to an example embodiment.

FIG. 2 is a diagrammatic representation of a side of an autonomous vehicle, e.g., one of autonomous vehicles 101 of FIG. 1, according to an example embodiment. Autonomous vehicle 101, as shown, is a vehicle configured for land travel. Typically, autonomous vehicle 101 includes physical vehicle components such as a chassis or a body 205, as well as conveyance mechanisms 210, e.g., wheels. In one embodiment, autonomous vehicle 101 may be relatively narrow, e.g., approximately two to approximately five feet wide, and may have a relatively low mass and relatively low center of gravity for stability.

Autonomous vehicle 101 may be arranged to have a working speed or velocity range of between approximately one and approximately forty-five miles per hour (mph), e.g., approximately twenty-five miles per hour, to accommodate inner-city and residential driving speeds. In some embodiments, autonomous vehicle 101 may have a substantially maximum speed or velocity in range between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

Autonomous vehicle 101 includes a plurality of compartments (e.g., compartments 215a and 215b). Compartments 215a and 215b may be assigned to one or more entities, such as one or more customer, retailers, and/or vendors. Compartments 215a and 215b are generally arranged to contain cargo, items, and/or goods. Typically, compartments 215a and 215b may be secure compartments. The compartments 215a and 215b may have different capabilities, such as refrigeration, insulation, etc., as appropriate. It should be appreciated that the number, size, and/or configuration of compartments 215a and 215b may vary. That is, although two compartments (215a and 215b) are shown, autonomous vehicle 101 may include more than two or less than two (e.g., zero or one) compartments.

In some instances, chassis or body 205 may be implemented as a modular body portion that can be attached and detached, mechanically and/or electrically, to or from conveyance mechanisms 210, propulsion components, etc. for autonomous vehicle 101. In this manner, chassis or body 205 can be interchangeable among different conveyance mechanisms 210, propulsion components, etc.

Figure 3:
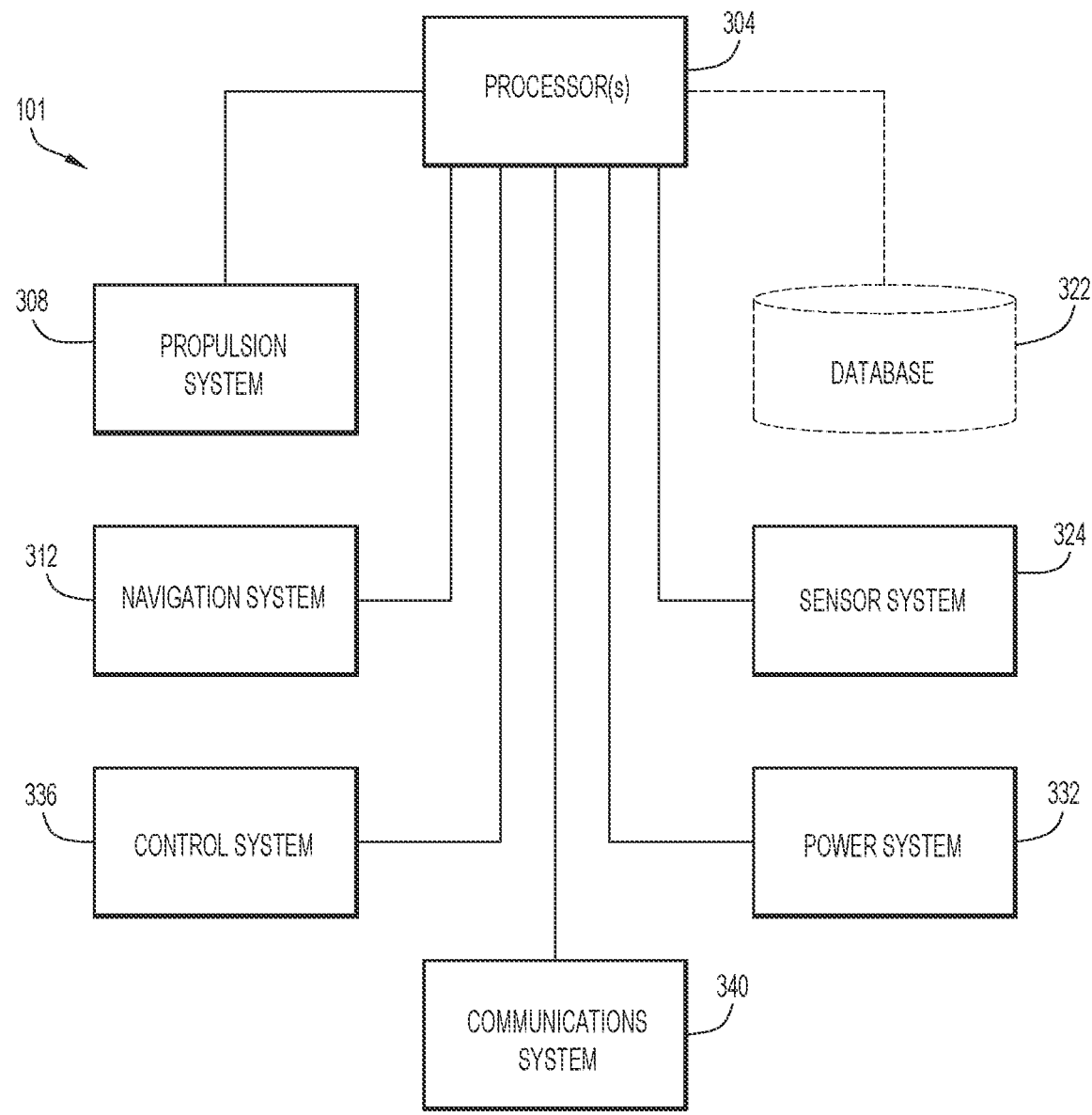
FIG. 3 is a block diagram representation of an autonomous vehicle, according to an example embodiment.

FIG. 3 is a block diagram representation of the autonomous vehicle 101, according to an example embodiment. With reference to FIGS. 2 and 3, the autonomous vehicle 101 includes one or more processor(s) 304, a propulsion system 308, a navigation system 312, a sensor system 324, a power system 332, a control system 336, and a communications system 340. It should be appreciated that processor(s) 304, propulsion system 308, navigation system 312, sensor system 324, power system 332, and communications system 340 are operatively coupled to and configured and/or integrated with, the body 205 (FIG. 2) of the autonomous vehicle 101 and generally cooperate to operate the autonomous vehicle 101.

Processor(s) 304 is/are operatively coupled and configured to send instructions to and to receive instructions from or for various components such as propulsion system 308, navigation system 312, sensor system 324, power system 332, and control system 336. In some embodiments, processor(s) 304 may additionally be operatively coupled to a database (DB) 322.

Propulsion system 308, or a conveyance system, is arranged to cause autonomous vehicle 101 to move, e.g., drive. For example, when autonomous vehicle 101 is configured with a multi-wheeled automotive configuration as well as steering, braking systems and a propulsion engine, propulsion system 308 may be arranged to cause the engine, wheels, steering, and braking systems to cooperate to drive the autonomous vehicle. The propulsion engine may be a gas engine, a turbine engine, an electric motor, and/or a hybrid gas and electric engine. As would be appreciated by a person of ordinary skill in the art, the propulsion system 308 may be configured as a drive system and may include additional or different components suitable or desirable for conveying an object, which are now known or hereafter developed, such as one or more axels, wheels, treads, wings, rotors, blowers, rockets, propellers, brakes, etc.

Although the autonomous vehicle 101 shown in FIGS. 1 and 2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

Navigation system 312 may be configured to control propulsion system 308 and/or provide guidance to an operator associated with the autonomous vehicle 101 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes one or more sensors configured to view and/or monitor conditions on or around the autonomous vehicle 101. The sensors, may include for example cameras (e.g., running at a high frame rate, akin to video), light detection and ranging (LiDAR) sensors, radar sensors, ultrasonic sensors, microphones, altimeters, accelerometers, pressure sensors, environmental sensors, piezoelectric sensors, and/or the like. Sensor system 324 generally includes onboard sensors, which allow autonomous vehicle 101 to safely navigate the autonomous vehicle 101 (via the navigation system 312), and to ascertain when there are objects near autonomous vehicle 101. For example, sensor system 324 may detect vulnerable persons such as pedestrians, cyclists, etc. and collect data relating to the vulnerable persons. In one embodiment, sensor system 324 may include propulsion systems sensors that monitor drive mechanism performance, drive train performance, and/or power system levels. The sensor system 324 also may include one or more microphones configured to detect sounds external to the autonomous vehicle 101, such as a siren from an emergency vehicle requesting a right-of-way, a honk from another vehicle, a verbal communication (e.g., a yell, etc.) from a person, etc.

Power system 332 is arranged to provide power to autonomous vehicle 101. Power may be provided as electrical power, gas power (liquid or non-liquid gas), or any other suitable power, e.g., solar power, fuel cell power, or battery power. In one embodiment, power system 332 may include a main power source, and an auxiliary power source that may serve to power various components of autonomous vehicle 101 and/or to generally provide power to autonomous vehicle 101 when the main power source does not does not have the capacity to provide sufficient power.

Communications system 340 allows autonomous vehicle 101 to communicate, as for example, wirelessly, with a fleet management system (not shown) or device/system that allows autonomous vehicle 101 to be controlled from a location remote from the autonomous vehicle. Communications system 340 generally obtains or receives data, stores the data, and transmits or provides the data to a fleet management system and/or to autonomous vehicles 101 within a fleet, such as fleet 100. The data may include, but is not limited to including, information relating to scheduled requests or orders, information relating to on-demand requests or orders, and/or information relating to a need for autonomous vehicle 101 to reposition itself, e.g., in response to an anticipated demand, information regarding an operational or mechanical need or behavior of the autonomous vehicle 101, information regarding an upcoming construction zone or other hazard in the path of the autonomous vehicle 101, etc.

In some embodiments, communications system 340 may allow autonomous vehicle to communicate with one or more persons. In various embodiments, the communications system 340 can be configured to enable communication via wireless local area access network communications/functionality (e.g., Wi-Fi®), wireless wide area access network communications/functionality (e.g., cellular), and/or any other wireless or mobile communication capability now known or hereafter developed.

In some embodiments, control system 336 may cooperate with processor(s) 304 to determine where autonomous vehicle 101 may safely travel, and to determine the presence of objects in a vicinity around autonomous vehicle 101 based on data (e.g., results/measurements/etc. from sensor system 324 and/or from an external system (not shown) communicating with the autonomous vehicle 101 via the communications system 340). In other words, control system 336 may cooperate with processor(s) 304 to function as an autonomous driving system that effectively determines what autonomous vehicle 101 may do within its immediate surroundings. Control system 336 in cooperation with processor(s) 304 may essentially control power system 332 and navigation system 312 as part of driving or conveying autonomous vehicle 101. In this sense, the control system 336 manages autonomous control of the autonomous vehicle 101.

Additionally, control system 336 may cooperate with processor(s) 304 and communications system 340 to provide data to or obtain data from other autonomous vehicles 101, a management server, a global positioning server (GPS), a personal computer, a teleoperations system, a smartphone, or any computing device via the communication system 340. In general, control system 336 may cooperate at least with processor(s) 304, propulsion system 308, navigation system 312, sensor system 324, and power system 332 to allow autonomous vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

The database 322 includes data stores or storage structures (e.g., files, databases, data structures, data or other repositories, etc.) that are configured to store information. In an example embodiment, the database 322 is configured to store information regarding the autonomous vehicle 101, jobs/tasks assigned to, and/or performed by, the autonomous vehicle 101, software for the autonomous vehicle 101, characterization information for characterizing one or more objects detected by autonomous vehicle 101, etc. In one example, the database 322 can include logged information collected by one or more of the systems of the autonomous vehicle 101 during operation of the autonomous vehicle 101. In some embodiments, one or more memory element(s) (not shown in FIG. 3) may also be included for the autonomous vehicle 101, which may overlap in whole and/or in part with database 322 to facilitate the storage of various information, data, etc. for use in various operations discussed herein.

In one embodiment, autonomous vehicle 101 may be substantially outfitted with multiple airbags, e.g., pedestrian airbags. Sensor system 324 may detect the presence of an object that may be determined to be a human object (e.g., a person such as a pedestrian, cyclist, etc.), and may cooperate with control system 336 to cause one or more airbags to deploy to cushion an impact of the person with autonomous vehicle 101 in the event that a collision with the human object is imminent or otherwise unavoidable. In some instances, a human object can include a whole of a human object (e.g., an entire person) or a portion of a human object (e.g., one or more arms, legs, etc. of a person). The multiple airbags may be positioned along the exterior of autonomous vehicle 101 such that the airbags may be selectively deployed based on the characteristics of the person with whom a collision is either imminent or in the process of occurring.

Figure 4:
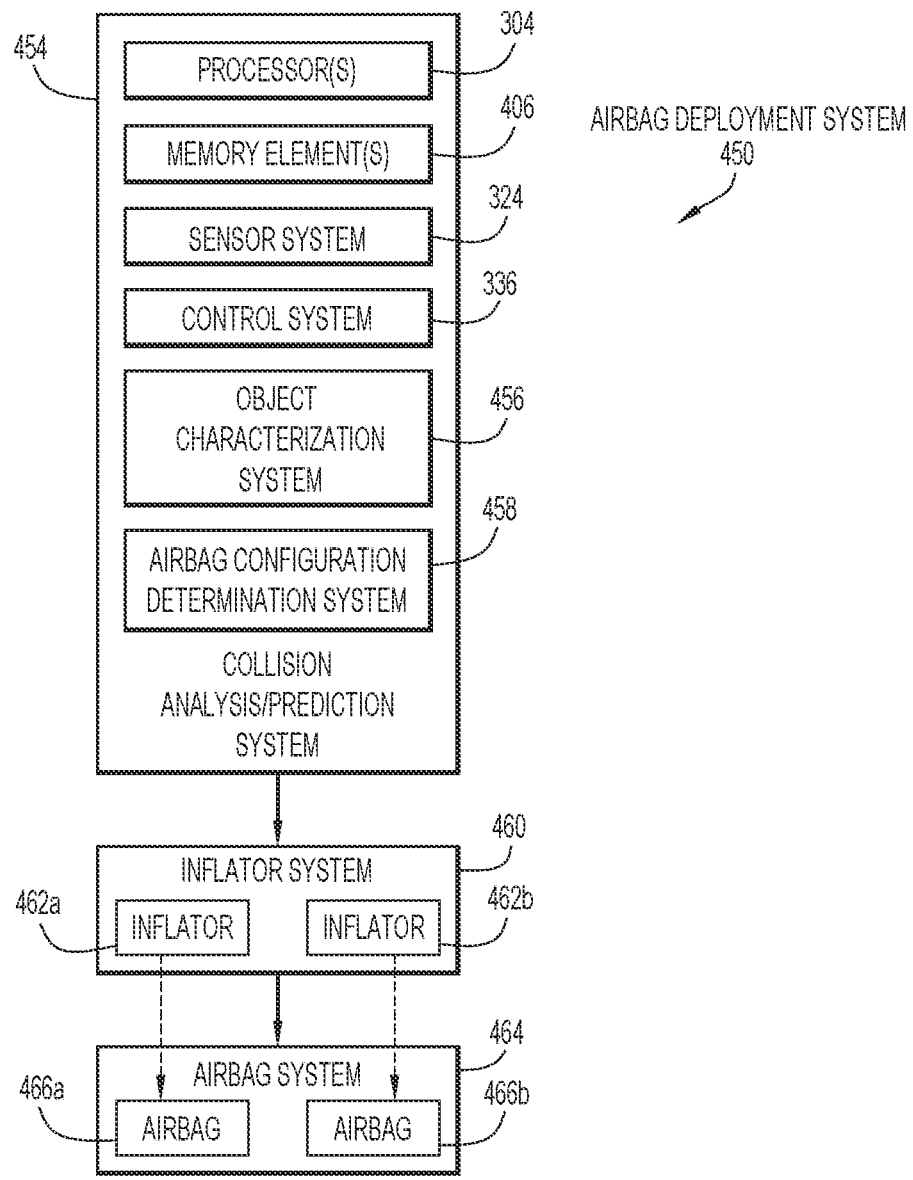
FIG. 4 is a block diagram representation of functional components that facilitate one or more external airbags to be selectively deployed, according to an example embodiment.

FIG. 4 is a block diagram representation of functional components that facilitate multiple airbags to be selectively deployed, according to an example embodiment. An airbag deployment system 450 may be included on a vehicle, e.g., an autonomous vehicle such as autonomous vehicle 101 of FIGS. 2 and 3. Airbag deployment system 450 includes a collision analysis/prediction system 454, an inflator system 460, and an airbag system 464. Inflator system 460 may include one or more inflator(s) 462*a* and 462*b*. Airbag system 464 may include one or more airbag(s) 466*a* and 466*b*.

Collision analysis/prediction system 454 is generally arranged to detect the presence of an object with which a collision is imminent or otherwise unavoidable, and to determine a configuration for the deployment of one or more of airbags 466*a*, 466*b* of airbag system 464. Collision analysis/prediction system 454 includes processor(s) 304, sensor system 324, and control system 336 of FIG. 3, as well as one or more memory element(s) 406, an object characterization system 456, and an airbag configuration determination system 458. Sensor system 324 detects the presence of an object such as a pedestrian and generally collects data related to the object. Object characterization system 456 characterizes the object based at least in part upon the data collected by sensor system 324. Characterizing the object may include, but is not limited to including, identifying an object type, identifying a height of the object, identifying a width of the object, etc. Airbag configuration determination system 458 uses an object characterization, also referred to herein as "characterization information," identified by object characterization system 456 to determine a configuration for airbags 466*a*, 466*b* of airbag system 464. That is, airbag configuration determination system 458 identifies which airbags 466*a*, 466*b* of airbag system 464 are to be deployed to mitigate any damage to the object, e.g., injuries to a pedestrian, and/or to autonomous vehicle 101 when a collision occurs. In various embodiments, characterization information may be stored via any combination of memory element(s) 406 and/or database 322 to facilitate various operations discussed herein.

In some embodiments, a suitable airbag configuration can be determined based on an object characterization that identifies one or more dimensions of an object but does not indicate whether the object is a human object or a non-human object.

For example, the airbag configuration determination system 458 can determine that one or more dimensions for the object satisfy (e.g., are greater than, less than, equal to, within a certain range or ranges, etc.) one or more dimensional thresholds that trigger the airbag configuration determination system 458 to determine a deployment configuration for one or both of airbags 466*a*, 466*b*. Consider in one instance, for example, that object characterization system 456 obtains two-dimensional (2D) and/or 3-dimensional (3D) sensor data from one or more sensors of sensor system 324 (e.g., image data from one or more optical cameras, infrared (IR) cameras, and/or the like, depth/distance data from one or more LiDAR sensors, etc.) and characterizes an object with which an imminent or unavoidable collision is to occur in order to determine a height of the object. For example, 2D image data can be obtained by the object characterization system 456 from one or more sensors of sensor system 324. Utilizing the 2D image data, which may be red-green-blue (RGB) data, IR data, etc., an object with which a collision is to occur can be identified and a 2D boundary can be overlaid onto object that identifies a vertical region defining the height of the object and/or a horizontal region defining the width of the object.

In one instance, airbag configuration determination system 458 can determine a suitable configuration of airbags 466*a* and/or 466*b* for deployment based on the height of the object (e.g., based on whether the object height is taller or shorter than one or more height thresholds, based on whether the object is height is within a threshold height range, etc.). It is to be understood that any combination of object dimensions may be utilized to determine a suitable configuration of airbags 466*a* and/or 466*b* for deployment.

In some embodiments, object characterizations may also include determining a type of an object with which an imminent collision is to occur such that an object type may be utilized along with one or more object dimensions may also be used to determine suitable deployment configurations for one or more of airbags 466*a* and 466*b*. For example, object characterization system 456 may utilize any combination of multidimensional analysis, machine learning, deep learning, artificial intelligence, and/or the like now known or hereafter developed in order to generate object characterizations/characterization information that characterize an object type for one or more objects with which a collision is imminent or otherwise unavoidable by autonomous vehicle 101.

In some instances, sensors of sensor system 324 can perform multiple scans of the object space in the direction of travel the autonomous vehicle 101 in order to generate object characterizations/characterization information that characterize one or more objects with which a collision is imminent or otherwise unavoidable.

In some instances, object characterization system 456 may utilize measurements/data obtained from sensor system 324 to generate, analyze, and extract information from point cloud data to characterize one or more objects. In one example, point cloud data may be utilized as images, such as depth maps or rasterized data, which can be analyzed using a convolutional neural network (CNN) for segmentation and characterization of one or more objects detected by sensor system 324. In another example, voxelized point cloud data can be analyzed/converted into volumetric grids or generalized image CNNs can be analyzed/converted into 3D CNNs to characterize one or more objects detected by sensor system 324.

In one example, knowing its speed and an estimated time of collision with a human or object as well as the characterization of the human or object (e.g., height, etc.), the autonomous vehicle 101, via airbag configuration determination system 458 can determine a suitable configuration for airbags 466*a* and/or 466*b* to be inflated in order to mitigate potential injuries to the pedestrian with which a collision is imminent or otherwise unavoidable.

Although the above example involves determining that an object is a human object in order to determine a suitable airbag configuration, in some embodiments, a suitable airbag configuration can also be determined based on characterizing an object as a non-human object that has one or more dimensions that satisfy one or more thresholds (e.g., is taller/wider or shorter/narrower than one or more height/width thresholds, is within a threshold height/width range, etc.). Further, although human and non-human objects are discussed for various examples, object characterizations may also indicate or identify whether an object is an animate non-human object (e.g., an animal, such as a dog, etc.) or an inanimate non-human object (e.g., road debris, etc.), which may further impact airbag configuration determinations in some embodiments.

In still some embodiments, as discussed above, a suitable airbag configuration may be determined based on characteristics indicating one or more dimensions of an object regardless of object type characteristics being determined for one or more object(s).

Airbag configuration determination system 458 may determine a suitable deployment configuration for airbag(s) 466a/466b to be inflated using any suitable method. In one embodiment, simulations may be used to determine a probability of certain types of injuries that may be incurred by a pedestrian based on simulated forces, moments, and other parameters. For example, simulations with no airbags deployed, simulations with a single airbag inflated, and simulations with multiple airbags inflated may be used to assess probabilities of different types of injuries given particular airbag configurations. Using data collected from simulations, airbag configuration determination system 458 may ascertain a suitable configuration for airbag(s) 466a/466b that may substantially minimize the likelihood of severe injury to a pedestrian given information such as a height of the pedestrian and a position of the pedestrian relative to a vehicle.

In another embodiment, airbag configuration determination system 458 may determine a suitable configuration for airbag(s) 466a/466b in order to mitigate potential damage to autonomous vehicle 101 (e.g., for hitting a bridge abutment, etc.) in addition to and/or in lieu of damage/injury to an object with which the autonomous vehicle is to collide. For example, simulations may also be used to determine a probability of certain types and/or extent of damage that may be incurred by autonomous vehicle 101 and/or various systems/components of autonomous vehicle 101 based on different sizes of objects (in lieu of and/or in combination with human injury simulations discussed above, for example). Thus, using data collected from simulations, airbag configuration determination system 458 may determine a suitable configuration for airbag(s) 466a/466b that may substantially minimize damage to autonomous vehicle 101 in addition to and/or in lieu of potential damage/injury to an object that may be incurred. In various embodiments, a suitable configuration for airbag(s) 466a/466b may identify one or more pressures to which airbag(s) 466a/466b is/are to be inflated, a time at which to begin inflation of airbag(s) 466a/466b, a rate or time at which airbag(s) 466a/466b is/are to be inflated to one or more pressures, combinations thereof, and/or the like.

Control system 336 may obtain configuration information from airbag configuration determination system 458, and may trigger appropriate inflator(s) 462a and/or 462b of inflator system 460 in order to inflate any combination of airbag(s) 466a/466b. Appropriate inflator(s) 462a/462b are generally inflator(s) 462a/462b that will cause the appropriate airbag(s) 466a/466b, i.e., airbag(s) 466a/466b identified by airbag configuration determination system 458, to deploy. Inflator(s) 462a/462b may each include a volume of compressed gas, as well as an electronically controlled valve that may be activated by inflator system 460 when a signal is received from control system 336. Activating electronically controlled valves of inflator(s) 462a/462b may cause inflator(s) 462a/462b to release compressed gas. In the described embodiment, compressed gas from inflator 462a may be released into airbag 466a, causing airbag 466a to inflate or to deploy. Similarly, compressed gas from inflator 462b may be released into airbag 466b causing airbag 466b to inflate or to deploy. Inflator system 460 may be arranged to control the release of compressed gas from inflator(s) 462a/462b such that the rate at which airbag(s) 466a/466b inflate may be substantially controlled.

It should be appreciated that while each inflator 462a, 462b may have an associated airbag 466a, 466b, inflators 462a, 462b may instead each be associated with more than one airbag 466a, 466b. In addition, multiple inflators 462a, 462b may be associated with a single airbag 466a, 466b. Further, it is to be understood that the number of inflator(s) 462a/462b and airbag(s) 466a/466b may vary widely. In other words, airbag deployment system 450 may include more than two inflators 462a, 462b and/or more than two airbags 466a, 466b.

Figure 5:
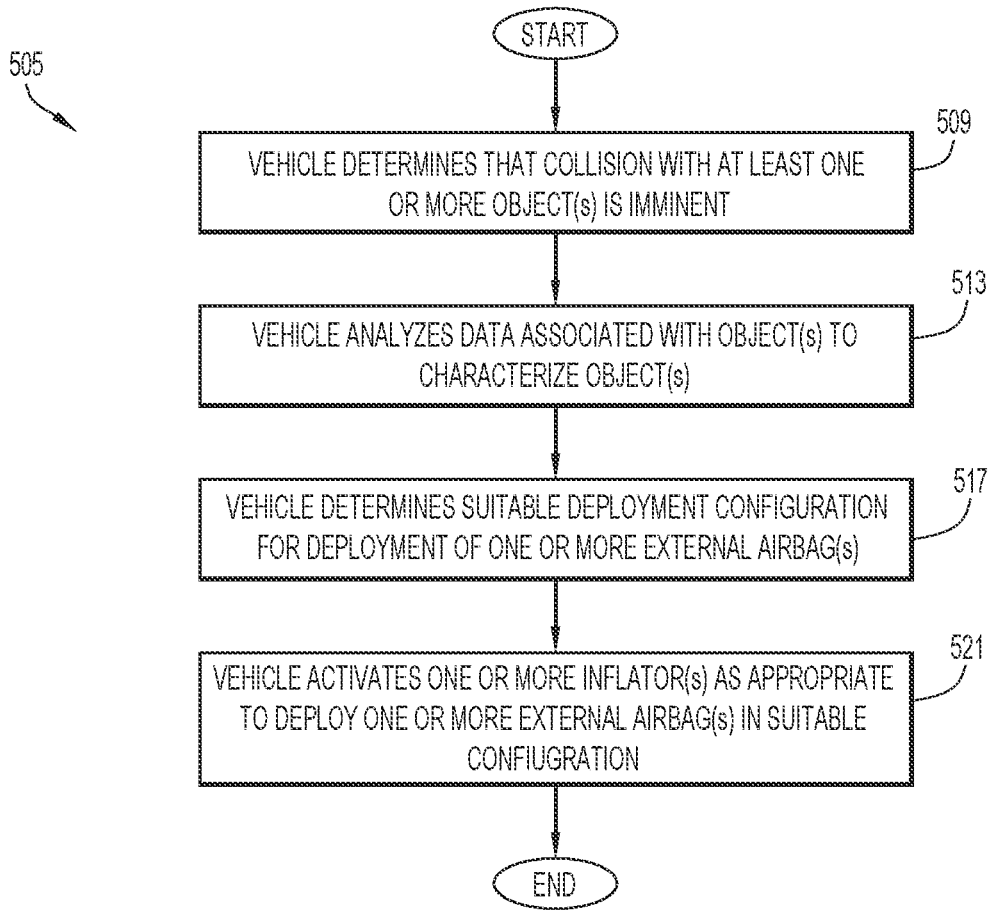
FIG. 5 is a flow chart illustrating an example method for selectively deploying one or more external airbags, according to an example embodiment.

FIG. 5 is a flow chart illustrating an example method for selectively deploying multiple external airbags, according to an example embodiment. At least one airbag may be deployed either in advance of an imminent collision or as a collision occurs. The deployment of such an airbag may effectively be timed to allow a desired pressure to be reached within the airbag substantially at a moment of impact, e.g., the airbag may reach a desired inflation pressure just as a vehicle and an object collide. A method 505 of selectively deploying one or more airbag(s) begins at a step 509 in which a vehicle, e.g., an autonomous vehicle such as an autonomous delivery robot vehicle, determines that a collision with one or more object(s) is imminent or otherwise unavoidable. The object(s) may be, in one embodiment, a vulnerable person, such as a pedestrian, cyclist, etc., a group of pedestrians, cyclists, etc.

Such a determination that a collision with one or more object(s) is imminent or otherwise unavoidable may be made using data collected from sensors associated with the vehicle, as well as perception and prediction algorithms of an autonomous driving system or a collision analysis/prediction system of the vehicle such as collision analysis/prediction system 454 of FIG. 4 (e.g., utilizing any combination of logic, etc. configured for processor(s), sensor system 324, control system 336, etc.).

For example, a collision with one or more object(s) may be determined to be imminent if the collision is expected to occur in less than a particular threshold of time, and/or if the collision may not be avoided even if the vehicle brakes or steers around the object(s). In general, a collision may be deemed to be imminent if the collision is unavoidable given a current trajectory of the vehicle, and substantially immediate braking or trajectory adjustment may not be effective to avoid the collision altogether.

Once the vehicle determines that a collision with one or more object(s) is imminent, the vehicle analyzes data collected by sensors with respect to the object(s) to characterize the object in a step 513. By analyzing the data collected from sensors, the object(s) may be characterized. Characterizing the object(s) may include, but not be limited to determining one or more dimensions of the object including a height, width, etc. through the use of an object characterization system such as object characterization system 456 of FIG. 4.

After the vehicle characterizes the object(s), a suitable deployment configuration for deploying one or more external airbag(s) is determined in a step 517. A suitable deployment configuration may effectively specify one or more external airbag(s) of multiple airbags to deploy. In general, a suitable configuration may be a configuration that allows for the object(s) to be protected by the airbag(s) during a collision, while substantially reducing any damage to the object(s) as a result of the collision and, in some instances, also potentially reducing damage to the vehicle itself (e.g., to body portions of the vehicle, structural element(s) of the vehicle (e.g., frame), etc.).

The suitable configuration may be determined by an airbag configuration determination system such as airbag configuration determination system 458 as described above with respect to FIG. 4. One method of determining a suitable configuration will be discussed below with reference to FIG. 6.

In a step 521, the vehicle activates at one or more inflator(s) to deploy one or more external airbag(s) in the suitable configuration. That is, inflator(s) that correspond to airbag(s) that are to be deployed may be actuated to cause those airbag(s)) to inflate. The airbag(s) may either be deployed prior to an anticipated collision, i.e., pre-deployed, or deployed as a collision is occurring. After the vehicle activates the one or more inflator(s), the method of deploying one or more external airbag(s) is completed.

Thus, broadly, a method may include detecting, by an autonomous vehicle, an object with which a collision is to occur; determining a deployment configuration for one or more external airbag(s) of the autonomous vehicle based on one or more dimensions of the object (e.g., based on characterization(s) of one or more object(s) with which the collision is to occur); and deploying the one or more external airbag(s) for the autonomous vehicle based on the deployment configuration. The deploying may include activating one or more inflator(s), as appropriate, to deploy one or more external airbag(s) based on the deployment configuration.

Figure 6:
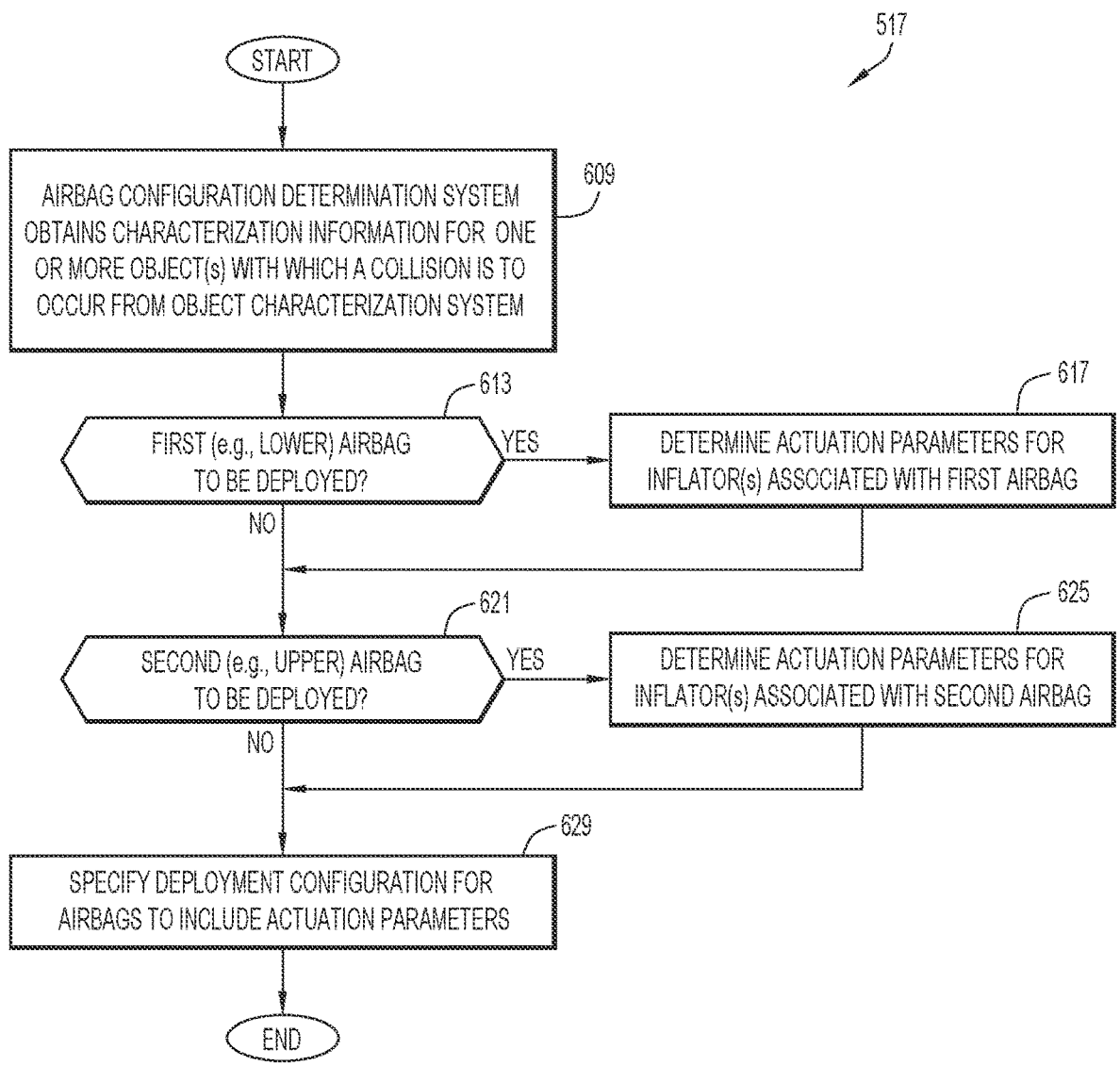
FIG. 6 is a flow chart illustrating an example method for determining a suitable deployment configuration for deploying one or more external airbags, according to an example embodiment.

With reference to FIG. 6, FIG. 6 is a flow chart illustrating an example method for determining a suitable deployment configuration for deploying one or more external airbag(s), e.g., step 517 of FIG. 5, will be described in accordance with an embodiment. In the described embodiment, for ease of discussion, a vehicle includes two airbags arranged to be deployed with respect to an exterior of the vehicle. It should be appreciated, however, that the number of airbags included in a vehicle may vary widely. For example, in some embodiments, only one airbag may be deployed with respect to an exterior of the vehicle or, in some embodiments, more than two airbag may be deployed with respect to an exterior of the vehicle.

A method 517 of determining a suitable deployment configuration for deploying one or more airbag(s) begins at a step 609 in which an airbag configuration determination system, e.g., airbag configuration determination system 458 of FIG. 4, obtains characterization information for one or more object(s) with which a collision is to occur from an object characterization system, e.g., object characterization system 456 of FIG. 4. The characterization information of the one or more object(s) may generally indicate any suitable characteristics of the one or more object(s) including, but not limited to including, one or more dimension(s) of the one or more object(s) (e.g., height, width of individual objects, if multiple objects are present, dimension(s) of a group of objects, and/or any combination or extension thereof) and, in some instances, an object type (e.g., human or non-human, animate non-human or inanimate non-human, etc.).

Based on the characterization information obtained in step 609 and other information such as a vehicle speed and/or an estimated time before a collision impact, a determination is made in step 613 as to whether a first external airbag of the vehicle is to be deployed. In one embodiment, the first airbag may be positioned at a lower/mid front portion of the vehicle. If it is determined that the first airbag is to be deployed, the implication is that when deployed, the first airbag would be likely to substantially cushion the object without causing damage to the object and/or to the vehicle in the event of a collision between the vehicle and the object. As such, in a step 617, actuation parameters for the inflator or inflators used to deploy the first airbag, are determined. Such actuation parameters may include, but are not limited to including, a time at which each inflator is to be triggered and/or a force or pressure that is to be provided by each inflator when activated.

In one embodiment, an airbag may have a substantially nominal, e.g., ideal, pressure, and an inflator may be triggered with a timing that enables the substantially nominal pressure to effectively be reached at a moment of impact between a vehicle and an object. In another embodiment, the desired pressure within an airbag may differ depending upon a size and a location of an object, and an inflator may be triggered with a timing that enables the substantially desired pressure within an airbag to be reached at a moment of impact between a vehicle and an object.

Several timing considerations may be involved when determining to deploy an airbag including, time to position, time to pressure, and stand-up time. The time to position may include the time to deploy an airbag, which may include the time involved to open a chamber holding the airbag, the time involved for the airbag to unfold, and/or the like. The time to pressure may include the time involved to inflate the airbag to one or more desired pressures. The stand-up time is the total time that an airbag remains inflated to a useful or desired pressure. Stated differently, once inflated to a useful/desired pressure, the stand-up time may represent the time that it may take for the pressure to decrease below a threshold (e.g., due to air leaking from the airbag). Generally, the different times may be represented as: time to position<time to pressure<stand-up time. In some instances, an airbag may be inflated to a first air pressure pre-collision with an object and may be further inflated to one or more second air pressures post-collision with the object, which may help to avoid strike through of the object with the body of the autonomous vehicle.

In some instances, the time to position may overlap with the time to pressure (e.g., an airbag can begin to be inflated as it is being deployed into a given position). In still some further instances, timing considerations may include time to position and time to pressure based on the type of airbag that is to be deployed, e.g., vented or non-vented/sealed. In still some instances, different pressures may be determined based on dimensions of the object (e.g., higher pressures for larger objects, etc.).

In general, timing considerations, depending on type of airbag and desired pressure(s), can range from tens of milliseconds to hundreds of milliseconds (or more). Thus, given the speed of the vehicle, the estimated time of collision with the object, the type of airbag(s) to be deployed, and one or more desired pressure(s) for the airbag(s), different actuation parameters may be determined for different ones of external airbag(s) 466a/466b, including, but not limited to, a time or times at to begin inflation of one or more airbag(s) 466a/466b (e.g., an initial time at which to begin inflation to a first pressure and a second time at which to continue inflation, say, post-collision, to begin inflation to a second pressure), a rate of inflation of one or more airbag(s)

466a, 466b, one or more desired pressure(s) of one or more airbag(s) 466a, 466b, and/or the like.

From step 617, method moves to a step 621 in which it is determined whether a second external airbag of a vehicle is to be deployed. In one embodiment, the second airbag may be positioned at an upper front portion of the vehicle. If it is determined that the second airbag is to be deployed, actuation parameters for the inflator or inflators associated with the second airbag are determined in a step 625. After the actuation parameters for each inflator associated with the second airbag are determined, in a step 629, the deployment configuration for the external airbags on the vehicle is specified to include the actuation parameters. In one instance, specifying the deployment configuration may include generating the deployment configuration including any determined actuation parameters via a format, etc. that can be consumed or otherwise executed by a control system for the vehicle (e.g., control system 336 via inflator system 460). Upon specifying the deployment configuration for the airbags such that the actuation parameters are included, the method of determining a suitable configuration of airbag deployment is completed.

Returning to step 613 and the determination of whether to deploy the first airbag, if it is determined that the first airbag is not to be deployed, then the indication is that deploying the first airbag is either relatively inconsequential with respect to the object or would likely cause harm to the object. Accordingly, the method moves from step 613 to step 621 in which it is determined whether the second airbag is to be deployed.

Returning to step 621 and the determination of whether to deploy the second airbag, if it is determined that the second airbag is not to be deployed, then the indication is that deploying the second airbag is either not necessary to protect the object or would potentially have an adverse effect on the object. As such, the method moves from step 621 to step 629 in which the deployment configuration of the airbags is specified. Although not illustrated in FIG. 6, it is to be understood that if neither the first airbag nor the second airbag are to be deployed, no actuation parameters may be specified for the deployment configuration.

In some instances, the determinations at 613 and 621 may be performed in relation to one or more dimensions of an object (e.g., height satisfying one or more threshold(s), etc.), as discussed in further detail with reference to FIG. 7, below. For example, in some instances, a determination may be made that no airbags are to be deployed if the object with which is collision is to occur does not satisfy a minimum height threshold or threshold range (e.g., is at or below), such as for collisions that may occur with general road debris.

Figure 7:
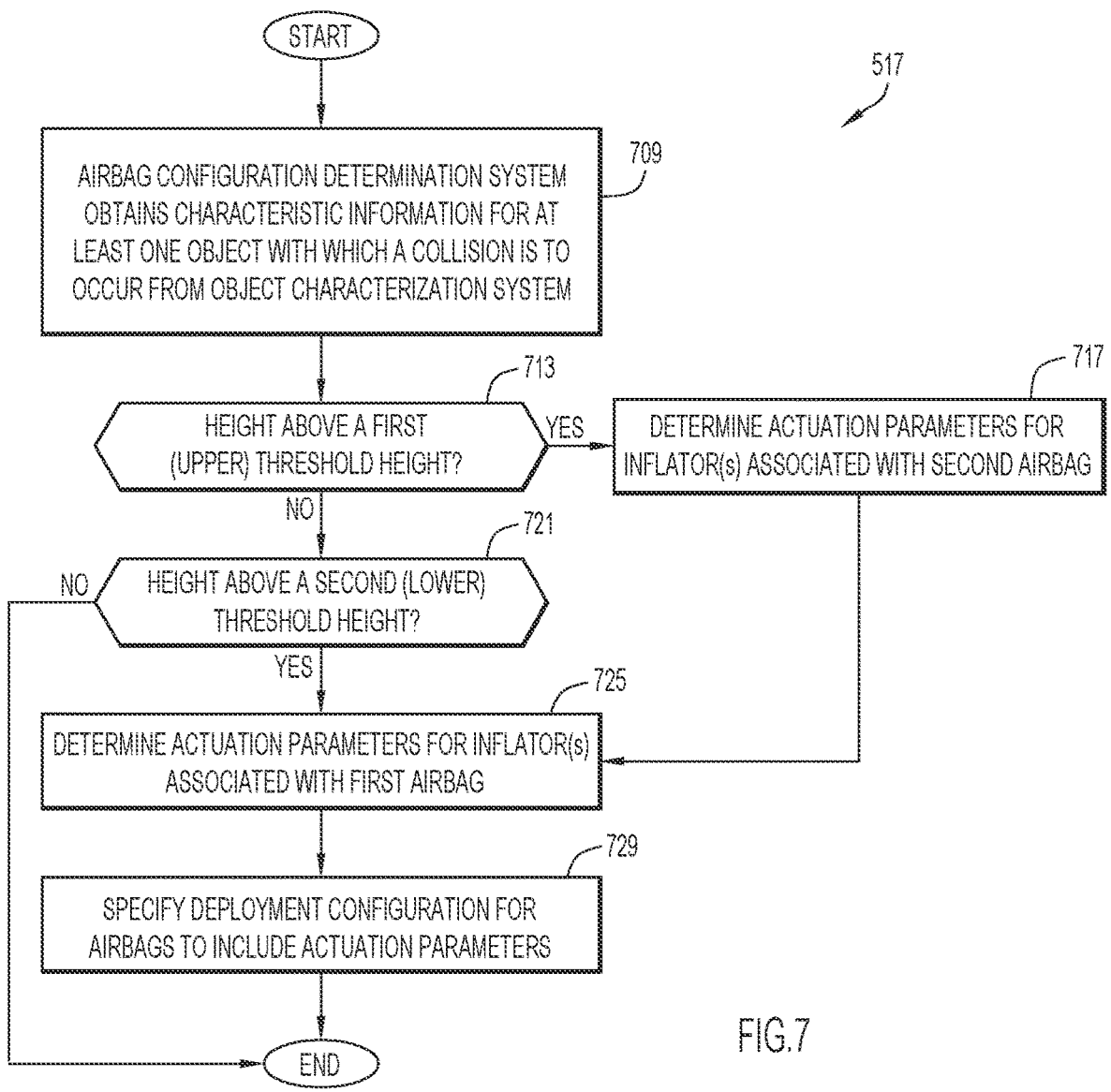
FIG. 7 is a flow chart illustrating another example method for determining a suitable deployment configuration for deploying one or more external airbags, according to an example embodiment.

FIG. 7 is a flow chart illustrating another example method for determining a suitable configuration for airbag deployment based on an overall height of an object, e.g., another potential embodiment of step 517 of FIG. 5, in accordance with an embodiment. For example, in one embodiment, method 517 for determining a suitable configuration for airbag deployment may begin at a step 709 in which an airbag configuration determination system of the vehicle obtains characteristic information for an object with which a collision is to occur, including a height of the object, from an object characterization system of the vehicle (e.g., object characterization system 456 of FIG. 4).

A determination is made in a step 713 as to whether the height of the object satisfies a first (e.g., an upper) threshold height. The threshold height may be any suitable height, and may vary widely. In one embodiment, the threshold height may be selected to be a height above which both a first airbag (e.g., a lower airbag) and a second airbag (e.g., an upper airbag) are to be deployed, and below which an additional determination is to be made as to whether the height of the object is above a second (lower threshold), such as, for example, to determine whether the first (e.g., a lower) airbag is or is not to be deployed. Consider, for example, that it may be desirable not to deploy either airbag for certain small objects (e.g., below a minimum threshold height), such as general road debris (e.g., limbs, small boxes, litter etc.) with which a collision is to occur.

In one example, if a determination is made at 713 that the height satisfies (e.g., is equal to or greater than) the first threshold height (YES at 713), the indication is that both the first airbag and the second airbag are to be deployed. As such, the method moves from step 713 to a step 717 in which actuation parameters for at least one inflator associated with the second (e.g., upper) airbag are determined. Once the actuation parameters for the inflator or inflators for the second airbag are determined, the actuation parameters for inflators associated with the first (e.g., lower) airbag are determined in step 725.

Returning to step 713, if a determination is made that the height of the object does not satisfy the first threshold height (NO at 713), then in a step 721, an additional determination is made as to whether the height of the object satisfies a second threshold height (e.g., a lower/minimum threshold height). If a determination is made at 721 that the height of the object does satisfy the second threshold height (YES at 721), the method moves from 721 to 725 in which actuation parameters for at least one inflator associated with the first airbag are determined in step 725.

From step 725, the method proceeds to a step 729 in which the deployment configuration for the airbags, or the deployment plan for the airbags, is specified. Once the configuration for the airbags is specified, the method of determining a suitable configuration for airbag deployment is completed.

Returning to step 721, if a determination is made that the height of the object does not satisfy the second (e.g., lower) threshold (NO at 721), the method may end, as it is determined that neither the first nor the second airbags are to be deployed for the autonomous vehicle.

In one example, the first (e.g., upper) threshold height may be selected to be approximately five feet such that both a first airbag and a second airbag may deploy when the height of the object is above five feet tall. In one example, a second (e.g., lower) threshold height may be selected to be approximately 3 feet such that the only the first airbag may deploy when the object with which the collision is to occur is between 3 feet and 5 feet or that neither the first nor the second airbag are to be deployed with the height of the object is below 3 feet.

Other heights or height ranges can be envisioned. For example, although the embodiment of FIG. 7 is discussed with reference to two height ranges, in some instances, additional height ranges can be envisioned. Consider, in one example, that multiple lower, front-facing airbags may be positioned for the autonomous vehicle 101, such as a mid-range airbag positioned about a middle portion of the front face of the autonomous vehicle 101 and a low-range airbag positioned about a lower portion of the front face of the autonomous vehicle. In this example, multiple heights/height ranges could be considered for determining a suitable airbag deployment configuration.

In general, one or more airbag(s) intended to be deployed externally with respect to an autonomous vehicle may be located substantially anywhere on the vehicle, i.e., disposed substantially anywhere on vehicle. Airbag(s) may be integrated onto a vehicle exterior at effectively any position. In one embodiment, one or more airbag(s) may include airbag(s) arranged in a manner such that, when deployed, the airbag(s) cover at least a portion of a front surface or front face of an autonomous vehicle. In one embodiment, one embodiment, one or more airbag(s) may include may include one airbag arranged in a manner such that, when deployed, the airbag covers at least a portion of a front surface or front face of an autonomous vehicle and another airbag arranged in a manner such that, when deployed, the airbag covers a top portion of the front surface or front face of the vehicle. That is, a configuration of deployed airbag(s) may effectively cover leading or forward facing edges of an autonomous vehicle. In some instances, airbag(s) may also be arranged about sides of an autonomous vehicle, for example, to protect objects from glancing or side/non-direct kinematics.

Figure 8:
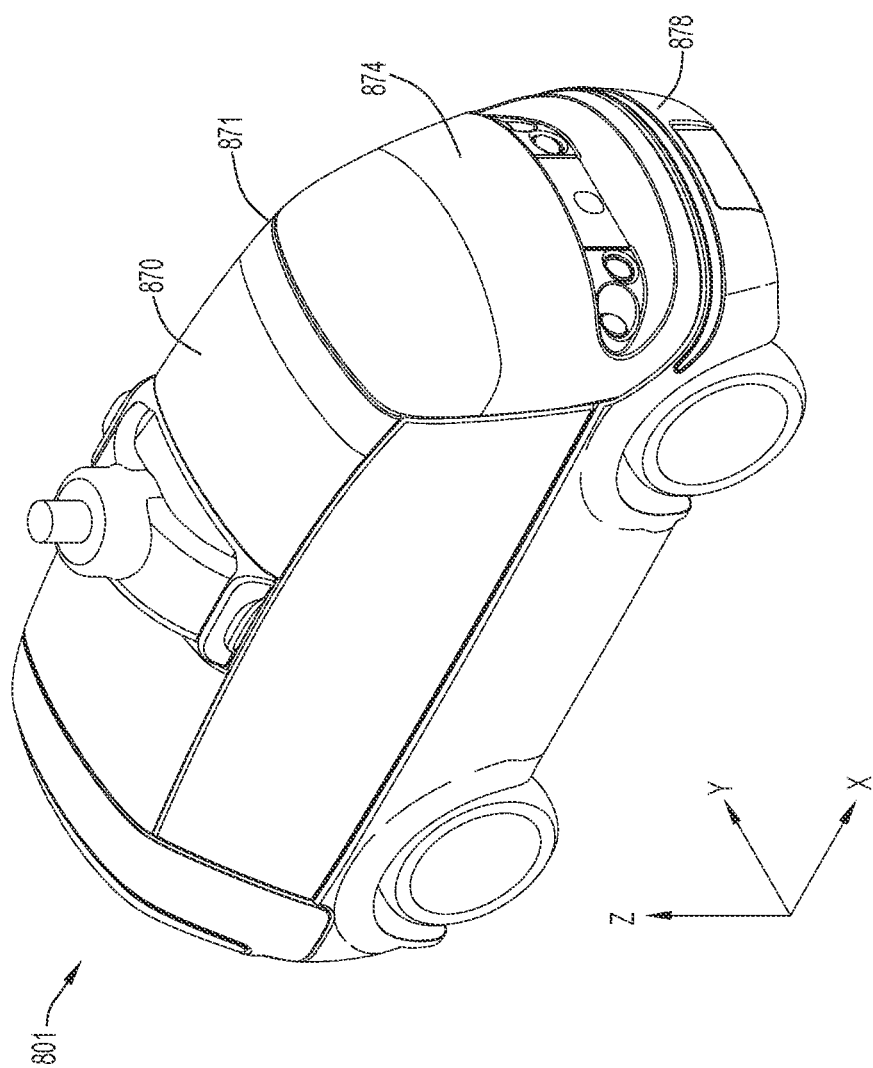
FIG. 8 is a diagrammatic representation of an autonomous vehicle that depicts locations from which one or more external airbags may be deployed, according to an example embodiment.

FIG. 8 is a diagrammatic representation of an autonomous vehicle, which depicts locations from which one or more airbag(s) may be deployed to cover an exterior of the autonomous vehicle, according to an example embodiment. An autonomous vehicle 801 may include a system (not shown in these figures) that includes a variety of sensors and at least two separate airbags (not shown in these figures) integrated onto an exterior of autonomous vehicle 801. Vehicle 801 may include a top zone 870, a first front zone 874, and a second front zone 878, relative to a z-axis.

Top zone 870 may encompass a top surface of autonomous vehicle 801, as well as a portion of a front surface and/or front panel of autonomous vehicle 801. In one embodiment, top zone 870 may include an edge 871 of autonomous vehicle 801 in which edge 871 may be considered to be "leading" for a forward direction of travel for the autonomous vehicle 801, relative to the x-axis. Thus, edge 871 may be referred to herein interchangeably as leading edge 871. First front zone 874 includes a middle front surface of autonomous vehicle 801, relative to the z-axis, in which the top zone 870 may represent an uppermost portion of the top surface and an uppermost portion of the front surface of the autonomous vehicle 801. Second front zone 878 may be a lower front surface of autonomous vehicle 801, relative to the z-axis, such that second front zone 878 may be considered to be lower than the first front zone 874, relative to the z-axis. In one embodiment, second front zone 878 may be part of a leading edge and/or a bumper of autonomous vehicle 801 that extends further forward than the first front zone 874, relative to the y-axis (e.g., the second front zone 878 may lead the first front zone 874 for a forward direction of travel of autonomous vehicle 801).

Airbag(s) (not shown) may be arranged to deploy from any combination of top zone 870, first front zone 874, and second front zone 878 and, in some instances, on the sides and/or rear of autonomous vehicle when a collision is imminent or substantially as a collision occurs. Prior to being deployed, the airbag(s) (not shown) may be arranged in a folded state such that the airbags are flat against surfaces of autonomous vehicle 801.

Figure 9:
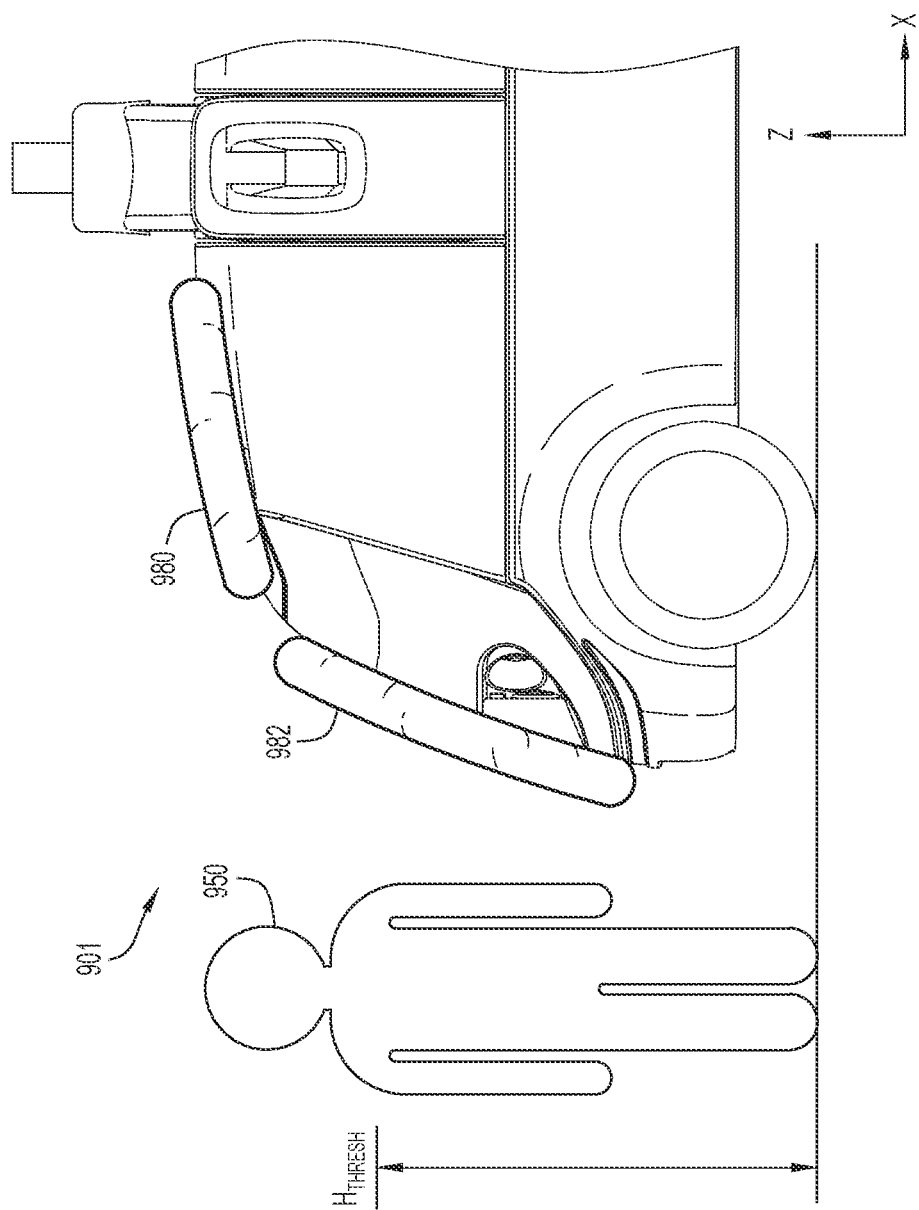
FIG. 9 is a diagrammatic representation of a portion of an autonomous vehicle that depicts one or more airbags deployed at one or more locations, according to an example embodiment.

FIG. 9 is a diagrammatic representation of a portion of an autonomous vehicle, which depict airbags deployed at one or more locations along a top and/or a front surface of an autonomous vehicle, according to an example embodiment. An autonomous vehicle 901 may be arranged to deploy any combination of airbags 980, 982 when a collision between vehicle 901 and an object, e.g., a pedestrian, is imminent or as a collision is occurring.

For example, as shown in FIG. 9 an airbag 980 is deployed along a top surface or zone of autonomous vehicle 901 and an airbag 982 is deployed along a front surface or zone of autonomous vehicle 901. Airbags 980, 982 may each be formed to have a single chamber. Alternatively, airbags 980, 982 may each be formed to have multiple chambers, e.g., multiple chambers that inflate sequentially from one end to the other. The shapes of airbags 980, 982 may vary widely. For example, airbag 980 may be shaped such that the potential for a rotational brain injury in a human object upon impact with airbag 980 and autonomous vehicle 901 may be reduced by substantially altering the kinematics of a collision.

Airbag 980 is positioned to effectively control the head and neck kinematics of taller human objects to lessen any adverse effects of a collision between autonomous vehicle 901 and taller human objects. In one embodiment, when a human object 950 is detected by autonomous vehicle 901, data relating to the human may be analyzed to determine whether the human object 950 has a height (along the z-axis shown in FIG. 9) that satisfies (e.g., is greater than or equal to) a threshold height ($H_{THRESH}$) at which airbag 980 is deployed, as discussed for various embodiments herein. As shown in FIG. 9, the human object 950 does have a height that satisfies the threshold height $H_{THRESH}$.

Airbag 982 covers a substantial portion of a front of autonomous vehicle 901 and is generally configured to reduce injuries to shorter human objects, or human objects who are of heights that are less than a threshold height, as discussed for various embodiments herein. Airbag 982 is also configured to control the kinematics associated with the thoraxes and abdomens of taller human objects. Shorter human objects may be protected during and after a collision by airbag 982, while taller human objects may be protected during and after a collision by both airbag 982 and airbag 980.

For example, for human object 950 shown in FIG. 9, both airbags 980 and 982 are deployed upon determining that the human object 950 has a height that satisfies (e.g., meets or exceeds) the height threshold $H_{THRESH}$.

It is to be understood that any of the combination of airbags as discussed above for FIGS. 8 and 9 may also help to reduce damage to an autonomous vehicle when a collision occurs with a human or non-human object and/or to help reduce damage to a non-human object (animate or inanimate) as well.

Figure 10:
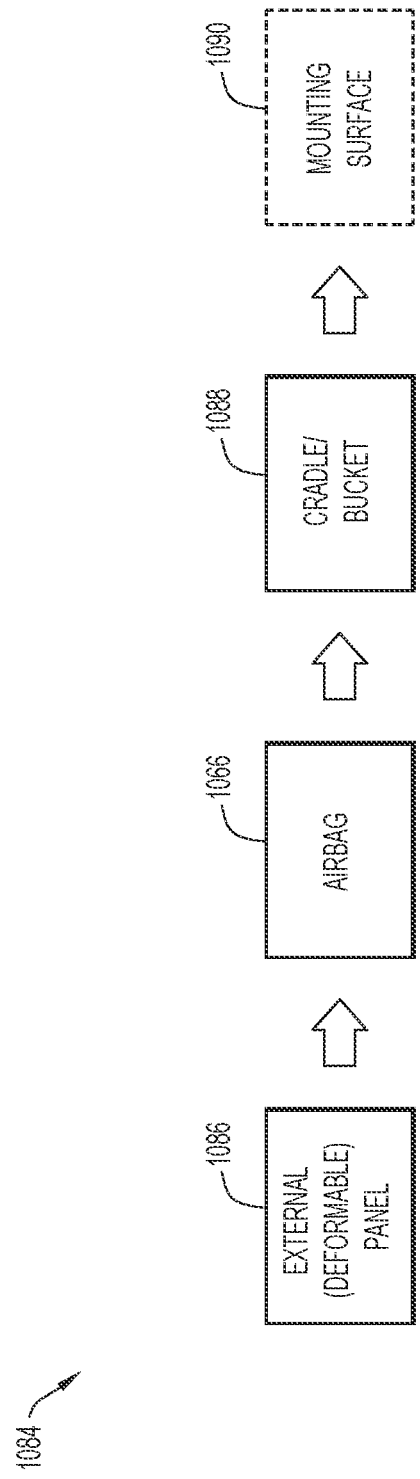
FIG. 10 is a block diagram representation of an overall airbag mounting configuration in accordance with an embodiment.

FIG. 10 is a block diagram representation of an overall airbag mounting configuration in accordance with an embodiment. An airbag mounting configuration 1084 includes an external panel 1086, at least one airbag 1066, a cradle 1088, and an optional mounting surface 1090. In one embodiment, external panel 1086 may be a front panel of an autonomous vehicle, such as autonomous vehicle 101 of FIGS. 2 and 3, which may encompass any of top zone 870, first front zone 874, and/or second front zone 878, as shown in FIG. 8. External panel 1086 may have an external surface or side and an internal surface or side. While the internal surface or side of the external panel 1086 may essentially face an interior of an autonomous vehicle, the external surface or side may face away from the interior of the autonomous vehicle and may effectively be exposed to an environment around the vehicle.

Cradle 1088 may include a bucket portion and may be mounted substantially on the internal surface or side of external panel 1086, and may be configured to support airbag 1066 such that airbag 1066, when deflated, is effectively held by cradle 1088 near or in contact with the internal surface of external panel 1086. In one embodiment, cradle 1088 may be mounted on the internal surface or side of external panel 1086, but may include a portion that effectively protrudes through external panel 1086 (e.g., through a cutout portion of the external panel).

Cradle 1088 may generally include a cradle mounting arrangement that enables cradle 1088 to be mounted on external panel 1086, as well as an airbag holding arrangement that holds or otherwise supports airbag 1066. Such a cradle mounting arrangement may include one or more bolts, brackets, fasteners, or the like. It should be appreciated that cradle 1088 may be mounted to external panel 1086 such that there is a gap or other offset between external panel 1086 and airbag 1066.

Cradle 1088 may be formed from any suitable material. Suitable materials include, but are not limited to including, composite materials such as plastic (e.g., polyphthalamide (PPA)), carbon fiber, and/or the like.

In one embodiment, cradle 1088 may be substantially mounted on another surface, such as optional mounting surface 1090 in an interior of an autonomous vehicle to provide additional support and/or to absorb at least some energy associated with the deployment of airbag 1066 and/or collision of the autonomous with an object (e.g., a human object, etc.) external to the autonomous vehicle. Such an optional mounting surface 1090 may be a surface of a frame member of the vehicle or a mounting arrangement of the vehicle interconnected with the frame member such that one or more brackets of cradle 1088 may be mounted on optional mounting surface 1090 of the mounting arrangement or frame of the autonomous vehicle. In some embodiments, cradle 1088 may include foam, or another sound deadening material, that effectively compensates for any misalignment between cradle 1088 (e.g., a bracket of cradle 1088) and optional mounting surface 1090.

Figure 11:
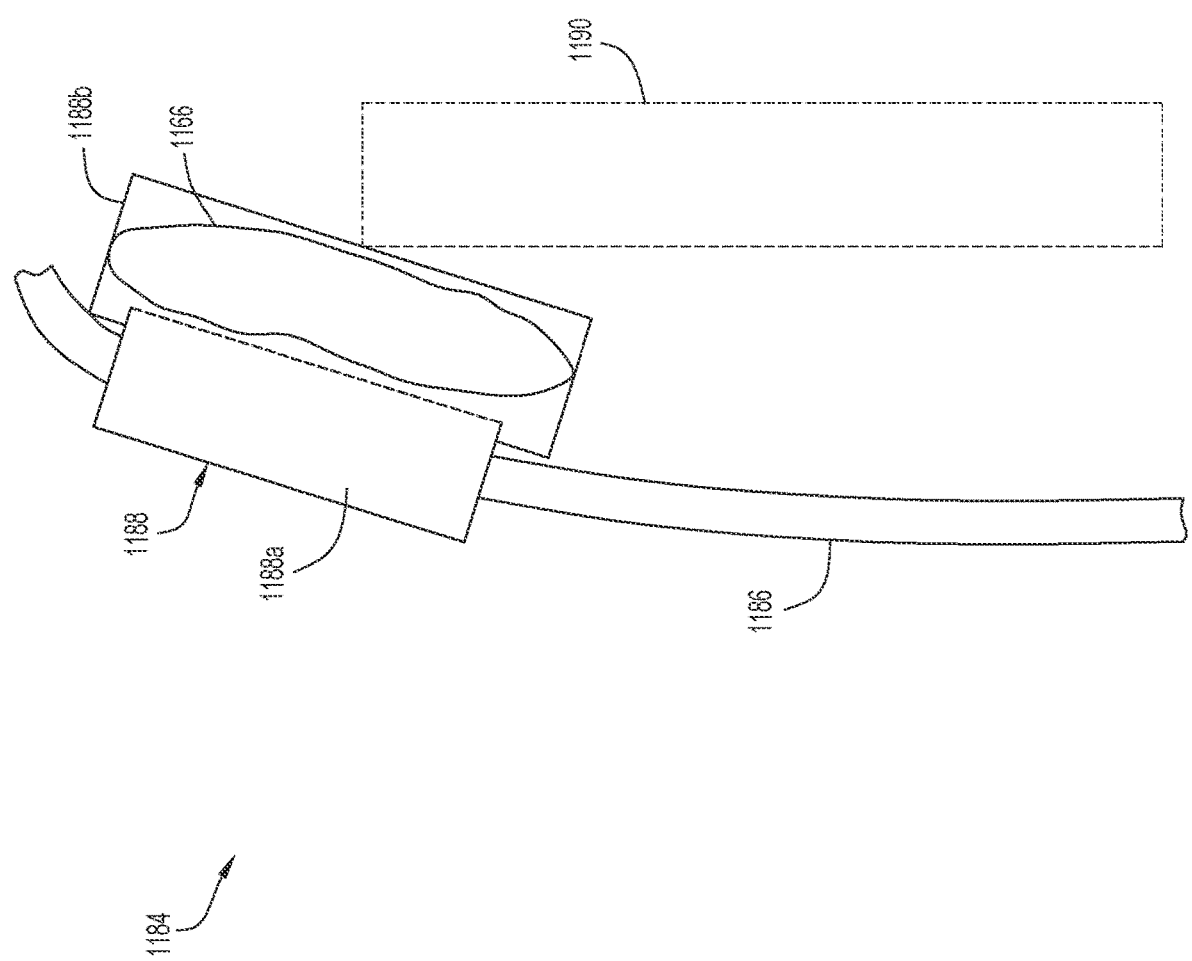
FIG. 11 is a diagrammatic side-view cross-sectional representation of an overall airbag mounting configuration in accordance with an embodiment.

FIG. 11 is a diagrammatic side-view cross-sectional representation of one example of an overall airbag mounting configuration in accordance with an embodiment. An airbag mounting configuration 1184 includes a portion of an external panel 1186, at least one airbag 1166, a cradle 1188, and an optional mounting surface 1190 of a mounting arrangement or frame of an autonomous vehicle onto which cradle 1188 may be mounted. External panel 1186 may be a front panel of a vehicle such as autonomous vehicle 101 of FIGS. 2 and 3. As shown, cradle 1188 includes a cover portion 1188a which may protrude through a portion of external panel 1186 in at least one embodiment (e.g., through a cutout portion or opening defined for the external panel 1186), and a bucket portion 1188b, which is effectively positioned on an interior side of external panel 1186 and includes a recess in which airbag 1166 may be positioned. Bucket portion 1188b is generally arranged to support airbag 1166.

In one embodiment, a cap (not shown) may be arranged to be included as a part of cradle 1188 and may be arranged to substantially cover the cover portion 1188a of cradle 1188. Such a cap (not shown) may relatively loosely cover the cover portion 1188a such that when airbag 1166 is deployed, the cap may be substantially forced off of the cover portion 1188a to enable airbag 1166 to deploy externally to an autonomous vehicle.

By adding components to an overall airbag mounting configuration which are arranged to absorb energy, as for example through the addition of compliance mechanisms as discussed in further detail herein, when an airbag contacts an object or a pedestrian, the airbag mounting configuration may serve to reduce injury to a human object that comes into contact with the airbag and/or reduce damage to an autonomous vehicle. As referred to herein a material, mechanism, arrangement, etc. that is considered to be 'more compliant' with regard to an impact with an object external to external panel 1186 and/or a force caused by deployment of at least one airbag 1166 may be considered to be less stiff while a material, mechanism, arrangement, etc. that is 'less compliant' with regard to an impact with an object external to external panel 1186 and/or a force caused by deployment of at least one airbag 1166 may be considered to be more stiff. Thus, compliance may be considered to be inversely related with stiffness (e.g., more compliant≈less stiff and less compliant≈more stiff).

For example, a cradle or bucket that supports an airbag may be arranged to provide compliance such that the cradle is substantially rigidly supported, but is still compliant enough to provide energy absorption. That is, a cradle may be structurally able to support the deployment of an airbag, but also exhibit some compliant characteristics that allow for energy absorption. Absorbing energy while deploying an airbag may serve to reduce injury to a human object that comes into contact with the airbag and/or reduce damage to an autonomous vehicle itself. When some forces or energy associated with airbag deployment are substantially absorbed by an autonomous vehicle from which the airbag is deployed, the amount of force exerted on a non-human or human object coming into contact with the airbag may be reduced.

Figure 12:
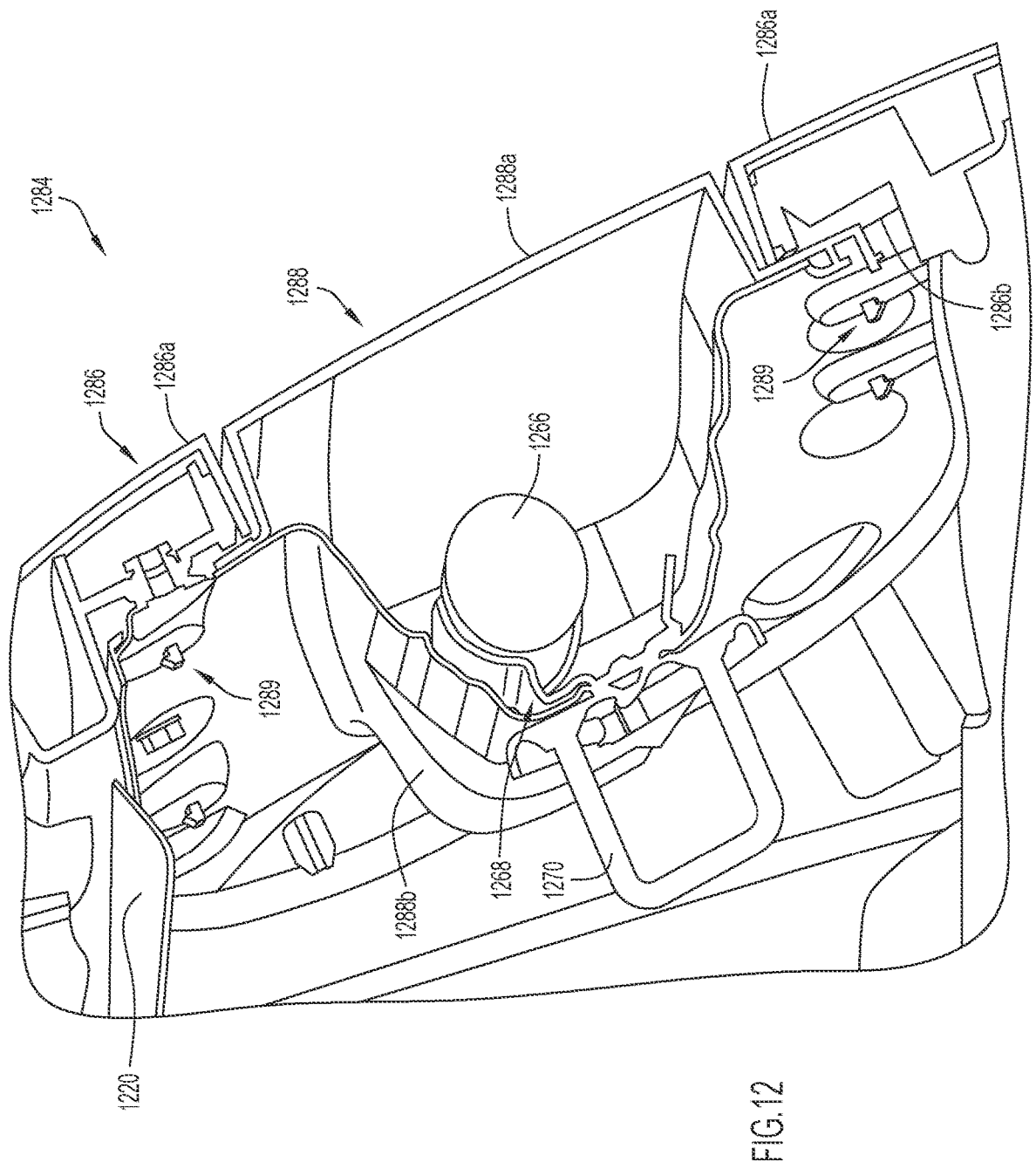
FIG. 12 is a detailed side-view cross-sectional representation of an overall airbag mounting configuration in accordance with an embodiment.

With reference to FIG. 12, FIG. 12 is a detailed side-view cross-sectional representation of an overall airbag mounting configuration in accordance with an embodiment. An airbag mounting configuration 1284 includes a portion of an external panel 1286, at least one airbag 1266, and a cradle 1288. No optional mounting surface is illustrated in FIG. 12. External panel 1286 may be a front panel of a vehicle such as autonomous vehicle 101 of FIGS. 2 and 3. As shown, external panel 1286 may include an exterior surface or side 1286a and an interior surface or side 1286b. While the internal surface or side 1286b of the external panel 1286 may essentially face an interior of the autonomous vehicle, the external surface or side 1286a may face away from the interior of the autonomous vehicle and may effectively be exposed to an environment around the autonomous vehicle. An upper seal flange 1220 is also shown in FIG. 12, which is discussed in further detail below with reference to FIG. 13A.

External panel 1286 may be formed of one or more deformable materials (e.g., aluminum, plastics, lightweight alloys, etc.) that may allow the external panel 1286 to be deform (permanently or temporarily) upon impact of an external object with external panel 1286 and/or at least one airbag 1266 deployed therefrom. In some embodiments, external panel 1286 may be formed of multiple panels combined or fused together to form a combined external panel unit.

As shown, cradle 1288 includes a cover portion 1288a and a bucket portion 1288b (e.g., relative to the z-axis, as shown in FIGS. 8 and 9), which is effectively positioned on the interior side 1286b of external panel 1286 and includes a recess in which airbag 1266 may be positioned. Bucket portion 1288b is generally arranged to support airbag 1266 via an airbag mounting arrangement 1268, which may be coupled or otherwise affixed to the bucket portion 1288b of cradle 1288. In some embodiments, a bracket 1270 may be coupled to the airbag mounting arrangement 1268, which may help to reduce the potential for the airbag 1266 to become disengaged (e.g., ejected) from the cradle 1288 during deployment of the airbag 1266.

Cradle 1288 may be mounted substantially on the internal side 1286b of external panel 1286, and may be configured to support airbag 1266 via airbag mounting arrangement 1268 such that airbag 1266, when deflated, is effectively held by cradle 1288 near or in contact with the internal side 1286b of external panel 1286. It is to be understood that in a deflated state, at least one airbag 1266 may be encapsulated within and/or mechanically coupled to an airbag housing, receptacle, mechanism or the like (e.g., inflators, etc.) that can be supported in cradle 1288 via the airbag mounting arrangement 1268. In one embodiment, cradle 1288 may be mounted on the internal side 1286b of external panel 1286, but may include a portion that effectively protrudes through external panel 1286.

Cradle 1288 may generally include a cradle mounting arrangement 1289 that enables cradle 1288 to be mounted on external panel 1286, as well as the airbag mounting arrangement 1268 that holds or otherwise supports airbag 1266. The cradle mounting arrangement 1289 may include one or more bolts, brackets, fasteners, bonding materials, or the like to enable the cradle 1288 to be mounted on external panel. It should be appreciated that cradle 1288 may be mounted to external panel 1286 such that there is a gap or other offset between external panel 1286 and airbag 1266.

Figure 13A:
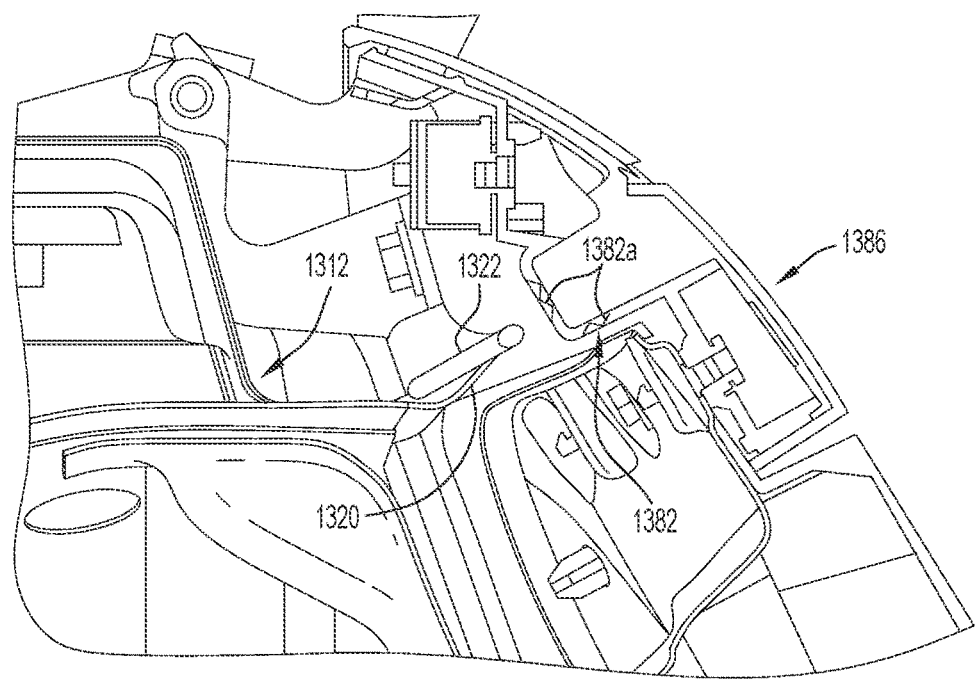
FIGS. 13A and 13B are detailed side-view cross-sectional representation of an upper flange and a lower flange of an autonomous vehicle frame that may be configured to support a font panel of the autonomous vehicle in accordance with an embodiment.
Figure 13B:
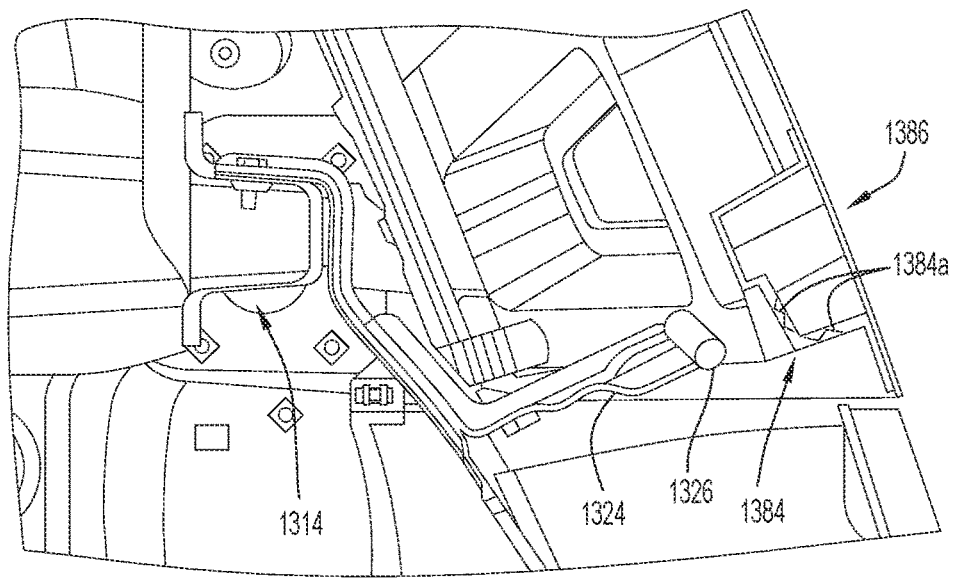

FIGS. 13A and 13B are detailed side-view cross-sectional representation of an upper flange and a lower flange of an autonomous vehicle frame that may be configured to support a front panel of the autonomous vehicle in accordance with an embodiment. With reference to FIG. 13A, an upper seal flange 1320 (relative to the z-axis shown in FIGS. 8 and 9) of an autonomous vehicle frame is shown that is located proximate to a top zone portion of an external panel 1386 (e.g. top zone 870, as shown in FIG. 8). With reference to FIG. 13B, a lower seal flange 1324 (relative to the z-axis shown in FIGS. 8 and 9) of an autonomous vehicle frame is shown that is located proximate a first front zone portion of external panel 1386 (e.g., first front zone 874, as shown in FIG. 8).

Upper seal flange 1320 may be formed integrally as part of a top beam 1312 of a frame of the autonomous vehicle or may be attached thereto and may be configured to generally align with an upper compliance structure 1382 that is configured for the interior side of the external panel 1386 proximate to the top zone portion of the external panel 1386. An upper seal 1322 can be provided for upper seal flange 1320. Lower seal flange 1324 may be formed integrally as part of a front beam 1314 of a frame of the autonomous vehicle or may be attached thereto and may be configured to generally align with a lower compliance structure 1384 that is configured for the interior side of the external panel proximate to the first front zone portion of the external panel 1386. A lower seal 1326 can be provided for lower seal flange 1324. Thus, the upper compliance structure 1382 is configured to interface with the upper seal 1322 and the lower compliance structure 1384 is configured to interface with the lower seal 1326 when the external panel is closed.

The upper and lower seals 1322, 1326 may be formed of a material, such as a foam or foam-like material, that has a low strain rate during impact of at least one object external to the autonomous vehicle with the external panel 1386 and/or an airbag (not shown) deployed therefrom. Foam or foam-like materials have a strain rate sensitivity that is typically stiffer (i.e., having a higher strain rate) in a short time duration (e.g., such as when an airbag is deployed) but softer (i.e., having a lower strain rate) for a longer time duration (e.g., such as during an impact of an external object with external panel 1386 and/or an airbag deployed therefrom).

When an external object (a human object or non-human object) impacts external panel 1386 and/or an airbag (not shown) that has deployed from the external panel, the impact of the external object effectively causes a force that is directed towards the interior of the external vehicle. Such force may be reduced by providing the upper seal 1322 provided along upper seal flange 1320 and the lower seal 1326 provided along lower seal flange 1324 such that the upper and lower seals 1322, 1326 can absorb some of the force. In some instances, the upper and lower seals 1322, 1326 can be bulb seals having a first radius when the external panel 1386 is opened for the autonomous vehicle and a second radius that is less than the first radius when the external panel 1386 is closed such that the upper and lower compliance structures 1382, 1384 are in contact with the upper and lower seals 1322, 1326. The second radius may be greater than a third radius, which may represent a radius of the seals 1322, 1326 when they are completely impacted, such that some cushioning/absorption features of the seals 1322, 1326 may be provided both by the shape/form of the seals (e.g., as bulbs, etc.) along with the material from which the seals may be formed (e.g., foam, etc. exhibiting a lower strain rate during an impact).

As noted above, a material, mechanism, arrangement, etc. that is more compliant may be considered to be less stiff while a material, mechanism, arrangement, etc. that is less compliant may be considered to be more stiff. The upper compliance structure 1382 and the lower compliance structure 1384 may be formed in a manner (e.g., having a certain structural formation) and/or of a material (e.g., a material exhibiting flexure capabilities, such as plastics, etc.) such that the upper and lower compliance structures 1382, 1384 may deform or crumple, temporarily or permanently, upon impact with an external object.

In some embodiments, the upper compliance structure 1382 may include one or more compliance features 1382a and the lower compliance structure 1384 may include one or more compliance features 1384a that may improve the ability of the upper and lower compliance structures 1382, 1384 to deform upon impact with an external object. In various embodiments, compliance features 1382a, 1384a may include any combination of intentionally weakened or thinned areas of compliance structures 1382, 1384, accordion-shaped formations/structures or the like for compliance structures 1382, 1384, and/or the like that may enhance the capability the compliance structures 1382, 1384 to be deformed or crumple upon impact of an external object with external panel 1386 and/or an airbag deployed therefrom.

With reference to FIG. 14, an overall airbag mounting configuration for an autonomous vehicle that includes a compliance arrangement including at least one compliance component will be described in accordance with an embodiment. An airbag mounting configuration 1484 includes an external panel 1486, a cradle 1488 that is arranged to support at least one airbag (not shown), and compliance components 1492a and 1492c of a compliance arrangement 1492 that is arranged to interface with a mounting surface of a mounting arrangement or frame (not shown) of an autonomous vehicle. External panel 1486, which may be a front panel of an autonomous vehicle such as autonomous vehicle 101 of FIGS. 2 and 3, is configured with an opening that allows an airbag (not shown) to be deployed such that the at least one airbag effectively protrudes through external panel 1486.

Cradle 1488 includes a cover portion 1488a that protrudes through or is otherwise flush with an opening defined within external panel 1486, and a bucket portion 1488b that is effectively positioned on an interior side of external panel 1486 and includes a recess in which an airbag (not shown) may be positioned.

When an airbag (not shown) deploys, a normal force 1494 effectively pushes against cover portion 1488a and causes the airbag to protrude through the opening in external panel 1486. That is, as an airbag (not shown) deploys with normal force 1494. A primary reaction force 1496 has a force in a substantially opposite direction normal to an external surface or side of external panel 1486 that can result from contact between the airbag and an object external to the autonomous vehicle. One or more compliance components 1492a, 1492c may be configured to substantially absorb some energy or force associated with the deployment of an airbag (not shown) (i.e., with force 1494) and/or absorb some energy or force that is in an opposite direction normal to the external side of the external panel 1486 (i.e., force 1496) due to an impact with an external object. Compliance components 1492a may, in one embodiment, enable some rotational and/or sliding motion 1498 of cradle 1488 as an airbag (not shown) deploys. In one embodiment, compliance components 1492a, 1492c may impact one or more internal components of an autonomous vehicle (e.g., the frame or a mounting arrangement associated therewith, etc.) during impact with an object external to the autonomous vehicle.

Compliance components for a compliance arrangement may vary widely. FIG. 15 is a diagrammatic side-view cross-sectional representation of an airbag mounting configuration for an autonomous vehicle that includes a compliance arrangement in which a compliance component is a tube with cuts to support buckling of the tubing in accordance with an embodiment. An airbag mounting configuration 1584 includes an external panel 1586, a cradle 1588 that is arranged to support at least one airbag (not shown), and a compliance arrangement 1592 that is arranged to interface with a mounting surface of a mounting arrangement or frame (not shown) of an autonomous vehicle. External panel 1586, which may be a front panel of an autonomous vehicle such as autonomous vehicle 101 of FIGS. 2 and 3, is configured with an opening that allows an airbag (not shown) to be deployed such that the airbag effectively protrudes through external panel 1586. Cradle 1588 includes a cover portion 1588a which protrudes through or is otherwise flush with an opening defined within external panel 1586, and a bucket portion 1588b that is effectively positioned on an interior side of external panel 1586 and includes a recess in which an airbag (not shown) may be positioned.

Compliance arrangement 1592 may be configured to substantially absorb some reaction energy or force associated with the deployment of an airbag (not shown) when the airbag deploys with force 1594 in a normal direction, as shown, and/or a direction that is normal to external panel 1586 and/or a primary reaction force that that has a force 1596 that is exerted in a substantially opposite direction normal to an external surface or side of external panel 1586 that can result from contact between the airbag and an object external to the autonomous vehicle, as shown. Compliance arrangement 1592 may include at least one compliance component, such as a tube 1592a that is coupled to a mounting arrangement 1592b that may be coupled to an autonomous vehicle frame (not shown). Tube 1592a may include a series of cut-outs, and/or may be similar to a bumper crush beam. When an airbag (not shown) deploys (i.e., with force 1594), tube 1592a may at least partially compress and, hence, facilitate the absorption of energy or force due to the deployment. Similarly, when an impact with an external object occurs (i.e., with force 1596), tube 1592a may at least partially compress and, hence, facilitate absorption of energy due to the impact.

Figure 16A:
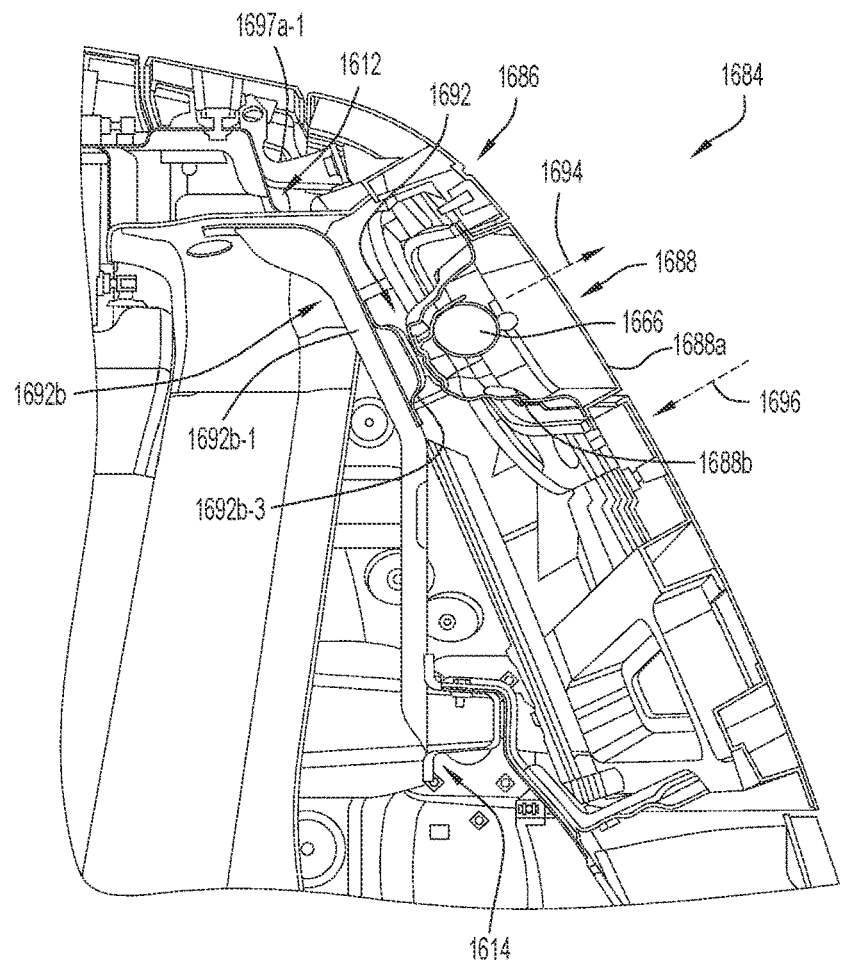
FIG. 16A is detailed side-view cross-sectional representation of a compliance arrangement including a mounting arrangement that may be utilized to support an airbag mounting configuration for an autonomous vehicle in accordance with an embodiment.
Figure 16B:
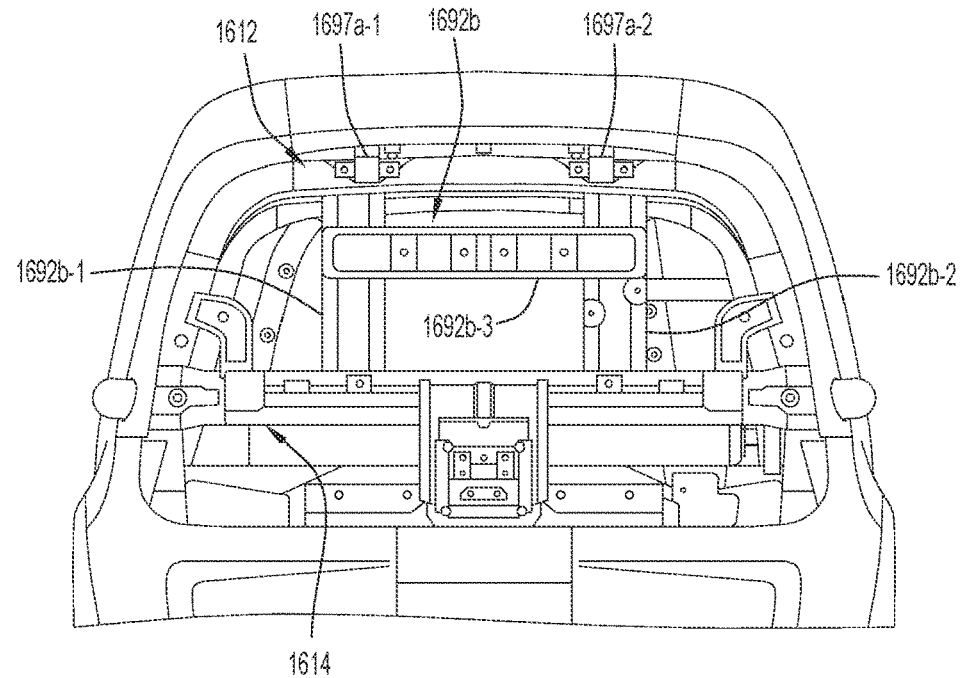
FIG. 16B is detailed front-view representation of the mounting arrangement of FIG. 16A in accordance with an embodiment.

FIG. 16A is detailed side-view cross-sectional representation of a compliance arrangement including a mounting arrangement that may be utilized to support an airbag mounting configuration of a vehicle in accordance with an embodiment. FIG. 16B is detailed front-view representation of the mounting arrangement of FIG. 16A in accordance with an embodiments. FIGS. 16A and 16B are discussed together.

In at least one embodiment, an airbag mounting configuration 1684 includes an external panel 1686, a cradle 1688 that is arranged to support at least one airbag 1666, and a compliance arrangement 1692. External panel 1686, which may be a front panel of an autonomous vehicle such as autonomous vehicle 101 of FIGS. 2 and 3, is configured with an opening that allows at least one airbag 1666 to be deployed such that the airbag effectively protrudes through external panel 1686. Cradle 1688 includes a cover portion 1688a which protrudes through or is otherwise flush with an opening defined within external panel 1686, and a bucket portion 1688b that is effectively positioned on an interior side of external panel 1686 and includes a recess in which at least one airbag 1666 may be positioned/secured.

The compliance arrangement 1692 may include one or more compliance components (not shown in FIG. 16A) and may include a mounting arrangement 1692b that may include one or more mounting components 1692b-1, 1692b-2, and 1692b-3 that may be affixed statically (e.g., bolted, welded, pinned, etc.) or dynamically (e.g., using hinges, flexible elements/materials, using materials that can easily be sheared/broken upon impact, etc. to help absorb an impact force by the compliance arrangement) to a frame of the autonomous vehicle, such as to a top beam 1612 and a front beam 1614 of the frame. As illustrated in FIG. 16B, both mounting components 1692b-1 and 1692b-2 can be secured in a vertical configuration to the top beam 1612 and the front beam 1614 of the frame of the autonomous vehicle and mounting component 1692b-3 can be secured in a horizontal configuration to both mounting component 1692b-1 and 1692b-2. Thus, mounting components of a mounting arrangement for a given airbag mounting configuration may be arranged in any manner and secured to a frame of an autonomous vehicle and/or to one another in accordance with embodiments herein. Hinges 1697a-1 and 1697a-2 are also shown, which can be coupled to external panel 1686 to enable the external panel 1686 to be opened and closed.

Any combination of the mounting components 1692b-1, 1692b-2, and/or 1692b-3 may provide one or more mounting surfaces to which one or more compliance components of the compliance arrangement 1692 may be secured. For example, as shown in FIG. 16A mounting component 1692b-3 may provide a mounting surface to which one or more compliance components (not shown in FIG. 16A) of compliance arrangement 1692 may be mounted such that the compliance components can be utilized to secure the bucket portion 1688b of cradle 1688 to the mounting surface and/or to interface with the bucket portion 1688b of cradle 1688 (but not necessarily be secured thereto).

Although the distance between the bucket portion 1688b and the mounting component 1692b-3 is illustrated in FIG. 16A as being relatively close in proximity, it is to be understood that the distance (e.g., space or gap) between the bucket portion 1688b and one or more mounting components 1692b-1, 1692b-2, and/or 1692b-3 may be varied dependent on the number, size, structure, type, shape, etc. of compliance components that may be utilized for a compliance arrangement for a given airbag mounting configuration, as discussed in further detail herein, below.

Compliance arrangement 1692 may be configured to substantially absorb some reaction energy or force associated with the deployment of at least one airbag 1666 when the at least one airbag deploys with a force 1694 in a direction normal to external panel 1686, as shown, and/or a primary reaction force that has a force 1696 in a substantially opposite direction normal to an external surface or side of external panel 1686 can result from contact between the airbag and an object external to the autonomous vehicle. Thus, compliance arrangement 1692 may be configured to substantially absorb some energy or force associated with the deployment of at least one airbag (i.e., force 1694) and/or to substantially absorb some energy or force that is in an opposite direction normal to the external side of the external panel 1686 (i.e., force 1696) due to an impact with an external object.

Various different exemplary compliance arrangements are now discussed in order to illustrate various potential configurations that can be envisioned. However, the example compliance arrangements/members are provided for illustrative purposes only and are not meant to limit the broad scope of the present disclosure. Virtually any compliance arrangement/members can be envisioned within the broad scope of the present disclosure and, thus, are clearly within the scope of the present disclosure.

FIG. 17 is a diagrammatic side-view cross-sectional representation of an airbag mounting configuration that includes a compliance arrangement including a compliance component which has a fold point in accordance with an embodiment. An airbag mounting configuration 1784 includes an external panel 1786, a cradle 1788 that is arranged to support at least one airbag (not shown), and a compliance arrangement 1792 that is arranged to interface with a mounting surface or frame (not shown) of a vehicle. External panel 1786, which may be a front panel of an autonomous vehicle such as autonomous vehicle 101 of FIGS. 2 and 3, is configured with an opening that allows at least one airbag (not shown) to be deployed such that the at least one airbag effectively protrudes through external panel 1786.

Cradle 1788 includes a portion 1788a which protrudes through or is otherwise flush with an opening defined within external panel 1786, and a portion 1788b which is effectively positioned on an interior side of external panel 1786 and includes a recess in which an airbag (not shown) may be positioned.

Compliance arrangement 1792 may be configured to substantially absorb some reaction energy or force associated with the deployment of an airbag (not shown) when the airbag deploys with force 1794 in a direction normal to external panel 1786, as shown, and/or to absorb some energy or force 1796 that is in an opposite direction normal to the external side of the external panel 1786 due to an impact with an external object, as shown.

Compliance arrangement 1792 may include one or more compliance components, such as a bar component 1792a that is connected to a fold point component 1792c, which may be an initiator for buckling, that is coupled to a mounting arrangement 1792b having one or more mounting components (not shown). Fold point component 1792c may be a hinge, a spring-loaded hinge, a spring, a tensioner, combinations thereof, and/or the like and may be tuned such that the inflation and deployment of an airbag (not shown) may be supported (i.e., for force 1794), while complying with standards which indicate a relatively safe amount of force (i.e., force 1796) that may be sustained by a human object and/or non-human object that comes into contact with the deployed airbag.

FIG. 18 is a diagrammatic side-view cross-sectional representation of an airbag mounting configuration that includes a compliance arrangement including a compliance component that is a strain-supporting component in accordance with an embodiment. An airbag mounting configuration 1884 includes an external panel 1886, a cradle 1888 that is arranged to support at least one airbag (not shown), and a compliance arrangement 1892 that is arranged to interface with a mounting surface or frame (not shown) of a vehicle. External panel 1886, which may be a front panel of an autonomous vehicle such as autonomous vehicle 101 of FIGS. 2 and 3, is configured with an opening that allows at least one airbag (not shown) to be deployed such that the at least one airbag effectively protrudes through external panel 1886.

Cradle 1888 includes a cover portion 1888a that protrudes through or is otherwise flush with an opening defined within external panel 1886, and a bucket portion 1888b that is effectively positioned on an interior side of external panel 1886 and includes a recess in which an airbag (not shown) may be positioned.

Compliance arrangement 1892 may be configured to substantially absorb some reaction energy or force associated with the deployment of an airbag (not shown) when the airbag deploys with force 1894 in a direction that is normal to external panel 1886, as shown, and/or a primary reaction force having a force 1896 that is exerted in a substantially opposite direction normal to an external surface or side of external panel 1886 that can result from contact between the airbag and an object external to the autonomous vehicle, as shown.

Compliance arrangement 1892 may include compliance component that is a strain-supporting component 1892a and may include a mounting arrangement 1892b. Strain-supporting component 1892a may be formed from a material that is dependent upon strain rate, e.g., foam. Strain-supporting component 1892a is arranged, when subjected to a relatively high strain rate such as during the inflation of an airbag (not shown) held in cradle 1888, to withstand the accompanying load (i.e., due to force 1894). When subjected to a relatively low strain rate, e.g., when an airbag (not shown) contacts an object or a pedestrian, strain-supporting component 1892a may absorb energy (e.g., due to force 1896). The strain-supporting component 1892a can be attached to one or both of a mounting surface of a mounting component (not shown) of the mounting arrangement 1892b and/or the bucket portion 1888b of cradle 1888 to facilitate the energy or force absorption.

Figure 19:
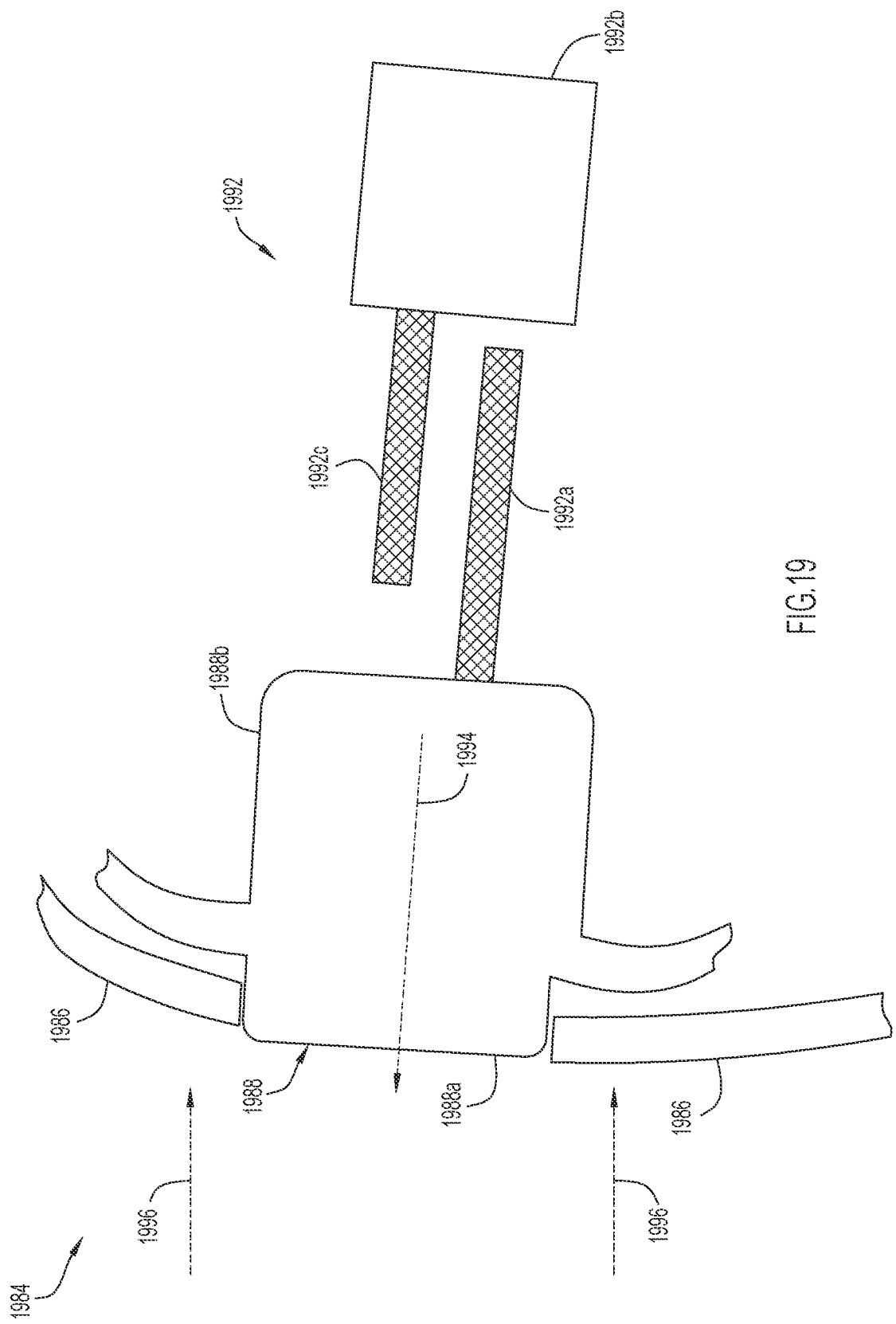
FIG. 19 is a diagrammatic side-view cross-sectional representation of an airbag mounting configuration for an autonomous vehicle that includes a compliance arrangement including compliance components that are a plurality of energy absorbing components in accordance with an embodiment.

FIG. 19 is a diagrammatic side-view cross-sectional representation of an airbag mounting configuration that includes a compliance arrangement including compliance components which that are a plurality of energy absorbing components in accordance with an embodiment. An airbag mounting configuration 1984 includes an external panel 1986, a cradle 1988 that is arranged to support at least one airbag (not shown), and a compliance arrangement 1992 that is arranged to interface with a mounting surface or frame (not shown) of a vehicle. External panel 1986, which may be a front panel of an autonomous vehicle such as autonomous vehicle 101 of FIGS. 2 and 3, is configured with an opening that allows at least one airbag (not shown) to be deployed such that the at least one airbag effectively protrudes through external panel 1986.

Cradle 1988 includes a cover portion 1988*a* that protrudes through or is otherwise flush with an opening defined within external panel 1986, and a bucket portion 1988*b* that is effectively positioned on an interior side of external panel 1986 and includes a recess in which an airbag (not shown) may be positioned.

Compliance arrangement 1992 may be configured to substantially absorb some reaction energy or force associated with the deployment of an airbag (not shown) when the airbag deploys with force 1994 in a normal direction, as shown, and/or a primary reaction force having a force 1996 that is exerted in a substantially opposite direction normal to an external surface or side of external panel 1986 that can result from contact between the airbag and an object external to the autonomous vehicle, as shown. Compliance arrangement 1992 includes a first compliance component 1992*a*, a second compliance component 1992*c*, and a mounting arrangement 1992*b* including one or more mounting components (not shown).

As shown in FIG. 19, first compliance component 1992*a* is substantially coupled to bucket portion 1988*b*, while second compliance component 1992*c* is substantially coupled to mounting arrangement 1992*b* (e.g., a mounting component of mounting arrangement 1992*b*). First and second compliance components 1992*a*, 1992*c* may be strain supporting components formed from a material such as foam or any suitable material that has characteristics which are dependent on a strain rate, and may be arranged with varying sizes, dimensions, structures, etc. such that first compliance component 1992*a* substantially withstands an airbag deployment force (i.e., force 1994), while second compliance component 1992*c* substantially absorbs forces (i.e., forces 1996) once an airbag (not shown) makes contact with a human object or non-human object. In one embodiment, first compliance component 1992*a* may be longer than second compliance component 1992*c* to facilitate the aforementioned force absorption features.

In one embodiment, first compliance component 1992*a* is arranged to withstand relatively high strain for a relatively short period of time, and second compliance component 1992*c* may be characterized by a higher stiffness than first compliance component 1992*a*. When an airbag (not shown) supported in cradle 1988 is undeployed, first compliance component 1992*a* may provide compliance. When an airbag (not shown) is deployed, second compliance component 1992*c* may provide energy absorption.

Thus, as shown in FIG. 19, at least one compliance component can be configured to absorb reaction energy or force associated with at least one of deployment of at least one airbag and impact with at least one object external to a vehicle such that a bucket portion of a cradle can interface with at least one mounting surface of a mounting component via at least one compliance component during at least one of the deployment of the at least one airbag and impact with at least one object external to the vehicle. Further, a first compliance component that that is attached to the bucket portion of the cradle and a second compliance component that is attached to a mounting surface of a mounting component of a mounting arrangement can be strain supporting components formed of a material having a high strain rate during deployment of the at least one airbag and a low strain rate during impact of at least one object external to the vehicle.

In general, providing compliance or compliant properties relative to a system that supports the deployment of one or more external airbags may also reduce the likelihood of significant injury to a human or non-human object that may come into contact with the one or more external airbags. An externally facing panel, e.g., a front panel, of a vehicle may be configured to provide compliance associated with an airbag deployment system.

Figure 20:
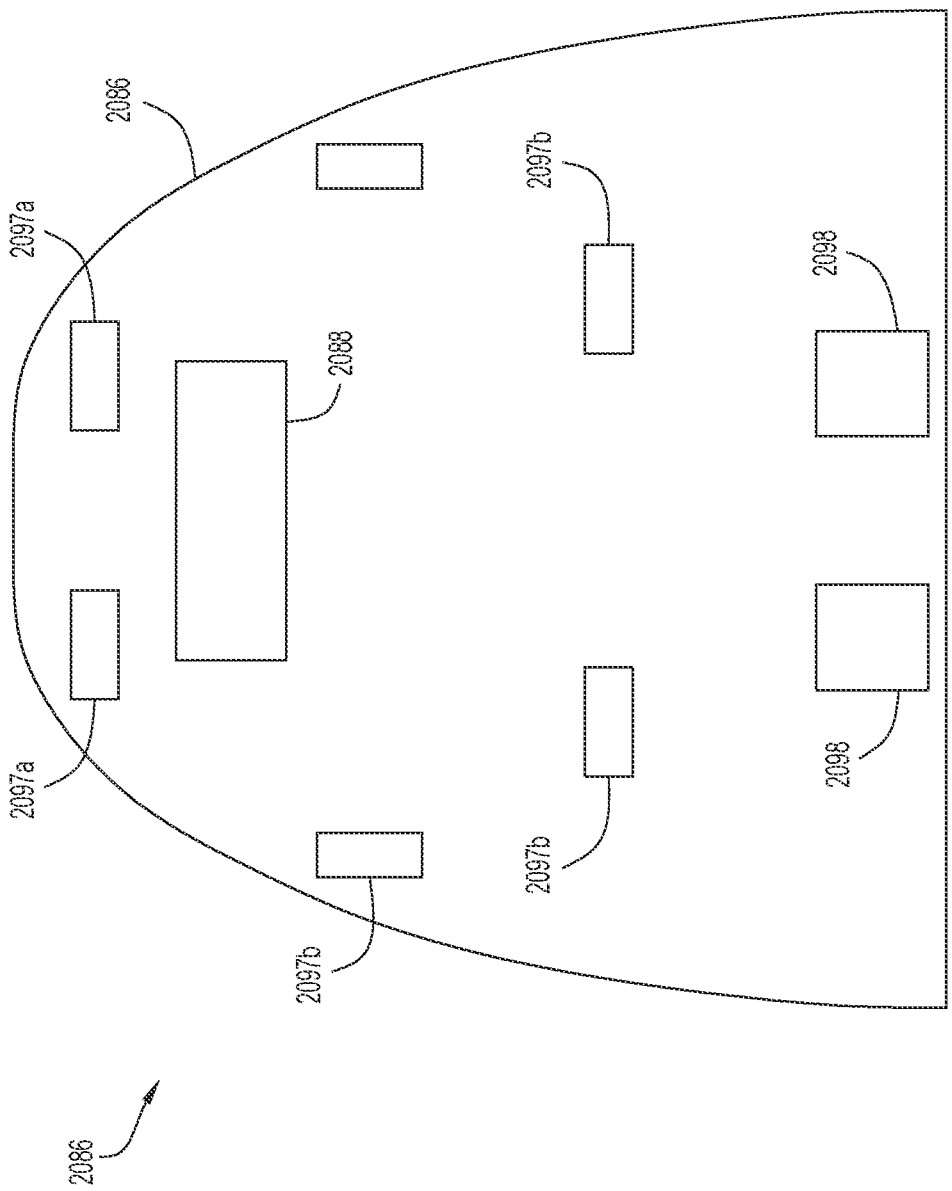
FIG. 20 is a diagrammatic representation of a front panel of an autonomous vehicle that includes airbag-related features in accordance with an embodiment.

FIG. 20 is a diagrammatic representation of a front panel of an autonomous vehicle that includes airbag-related features in accordance with an embodiment. A front panel 2086 is arranged to be externally facing, and mounted on an autonomous vehicle frame or chassis. In one embodiment, front panel 2086 may include hinges 2097*a*, alignment components or mountings 2097*b*, and latches 2098. An airbag arrangement 2088 including a cradle and at least one airbag (not shown) may be substantially attached to an interior surface or side of front panel 2086, as discussed herein. The attachment of airbag arrangement 2088 may include the use of any combination of bolts, bracket, bonding materials, and/or the like that substantially attach a cradle of airbag arrangement 2088 to front panel 2086.

Hinges 2097*a*, which may be arranged to rotate axially (i.e., relative to the y-axis, as shown in FIG. 8) to enable front panel 2086 to rotate upwards, may be substantially fixed to front panel 2086 and to a vehicle frame (e.g., to a top beam of the frame, as generally illustrated in FIG. 16A). In one embodiment, hinges 2097*a* may be attached to an interior and/or approximately top zone or surface of front panel 2086 (e.g., top zone 870, as shown in FIG. 8) by compliant brackets.

Alignment components or mountings 2097*b* may be semi-floating, and may be formed from foam. Alignment components or mountings 2097*b* are typically configured to line up with adjacent vehicle panels and, in some instance, one or more mounting members of a mounting arrangement, when front panel 2086 is effectively closed. Alignment components or mountings 2097*b* may be substantially rigid, but have some compliance. In one embodiment, alignment components or mountings 2097*b* may be formed from a hard-facing material for abrasion properties and toughness and from foam for bulk energy absorption. For example, alignment components or mountings 2097*b* may be formed from a thin film of metal with a foam backing or a relatively hard plastic with a foam backing.

Latches 2098 may be substantially fixed, and may be compliant. Latches 2098 may be fixed along a first front zone of the autonomous vehicle (e.g., first front zone 874, as shown in FIG. 8). To provide compliance, latches 2098 may include an overslam allowance. Latches 2098 and/or hinges 2097*a* may have some play (e.g., movement), and the play may be used to enable latches 2098 and/or hinges 2097*a* to absorb energy before front panel 2086 is deformed.

In one embodiment, latches 2098 may be held in placed by a shear pin such that energy may be absorbed in shear. As will be appreciated by those skilled in the art, shear pins are generally features that are configured to substantially fail when a threshold amount of force is applied.

Figure 21:
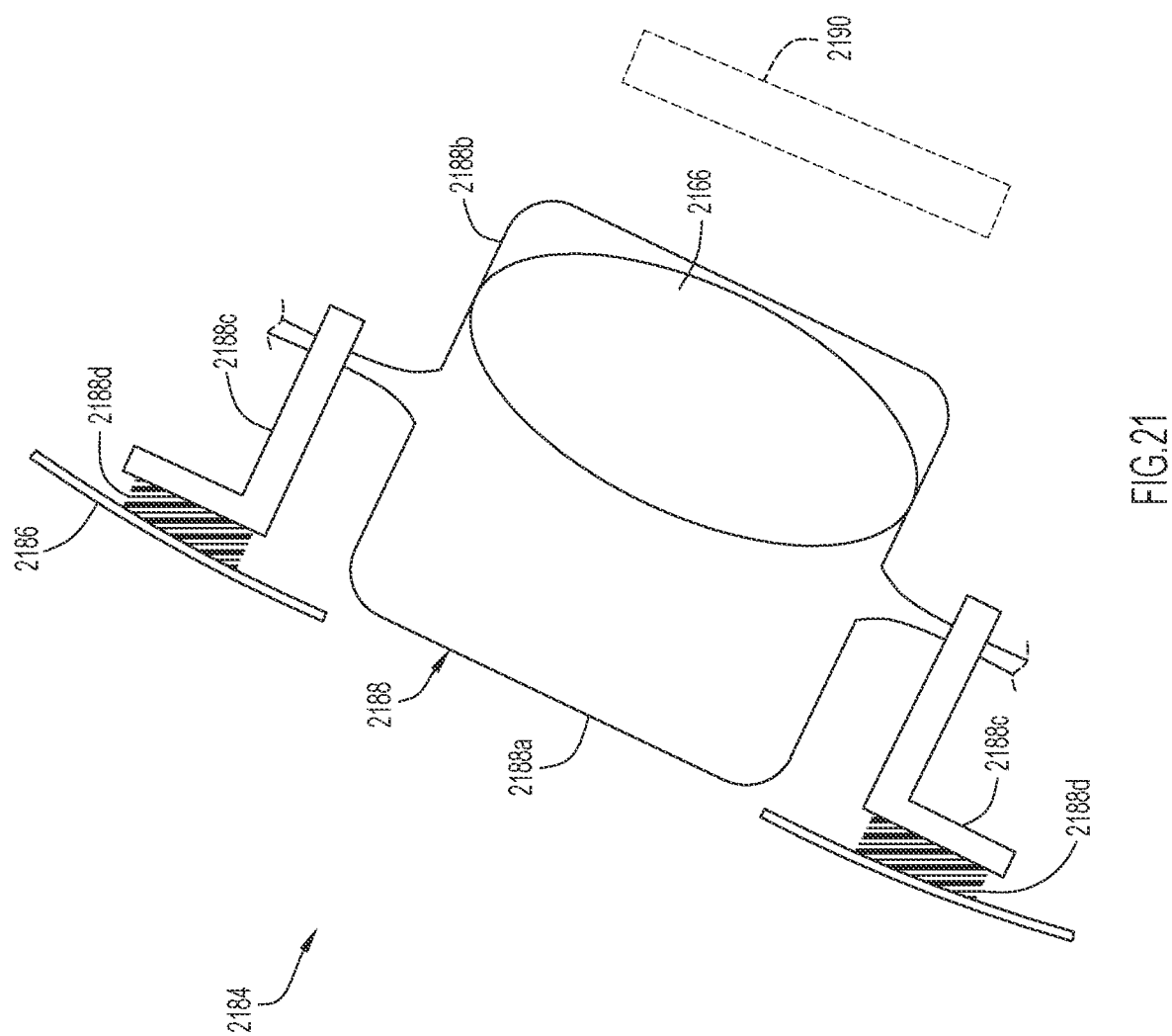
FIG. 21 is a diagrammatic side-view cross-sectional representation of an airbag mounting configuration for an autonomous vehicle that includes a first cradle mounting arrangement to mount an airbag cradle to a front panel or cap in accordance with an embodiment.

When a cradle as affixed or otherwise attached to an interior surface of a front panel or an external-facing panel of a vehicle, the cradle may be attached through the use of mechanical fasteners such as any combination of brackets, bolts, screws, bonding materials, and/or the like. FIG. 21 is a diagrammatic side-view cross-sectional representation of an airbag mounting configuration that includes a first cradle mounting arrangement that includes a bracket to mount an airbag cradle to a front panel or cap in accordance with an embodiment. An airbag mounting configuration 2184 includes an external vehicle panel 2186, an airbag cradle arrangement 2188, an airbag 2166, and a reaction surface 2190 that may be coupled to airbag cradle arrangement 2188.

Airbag cradle arrangement 2188 includes a top or cover portion 2188a, a bottom or bucket portion 2188b, bracket arrangements 2188c, and bonding material 2188d. Bracket arrangements 2188c may be attached to cover portion 2188a and to bucket portion 2188b such that cover portion 2188a and bucket portion 2188b are effectively coupled together, as for example through the use of bolts (not shown) that are part of bracket arrangements 2188c. In one embodiment, bracket arrangements 2188c may be arranged to maintain a gap between edges of cover portion 2188a and bucket portion 2188b. Brackets arrangements 2188c, which may be substantially rigid, may be bonded to an internal surface of panel 2186 using bonding materials 2188d, such as adhesives.

Figure 22:
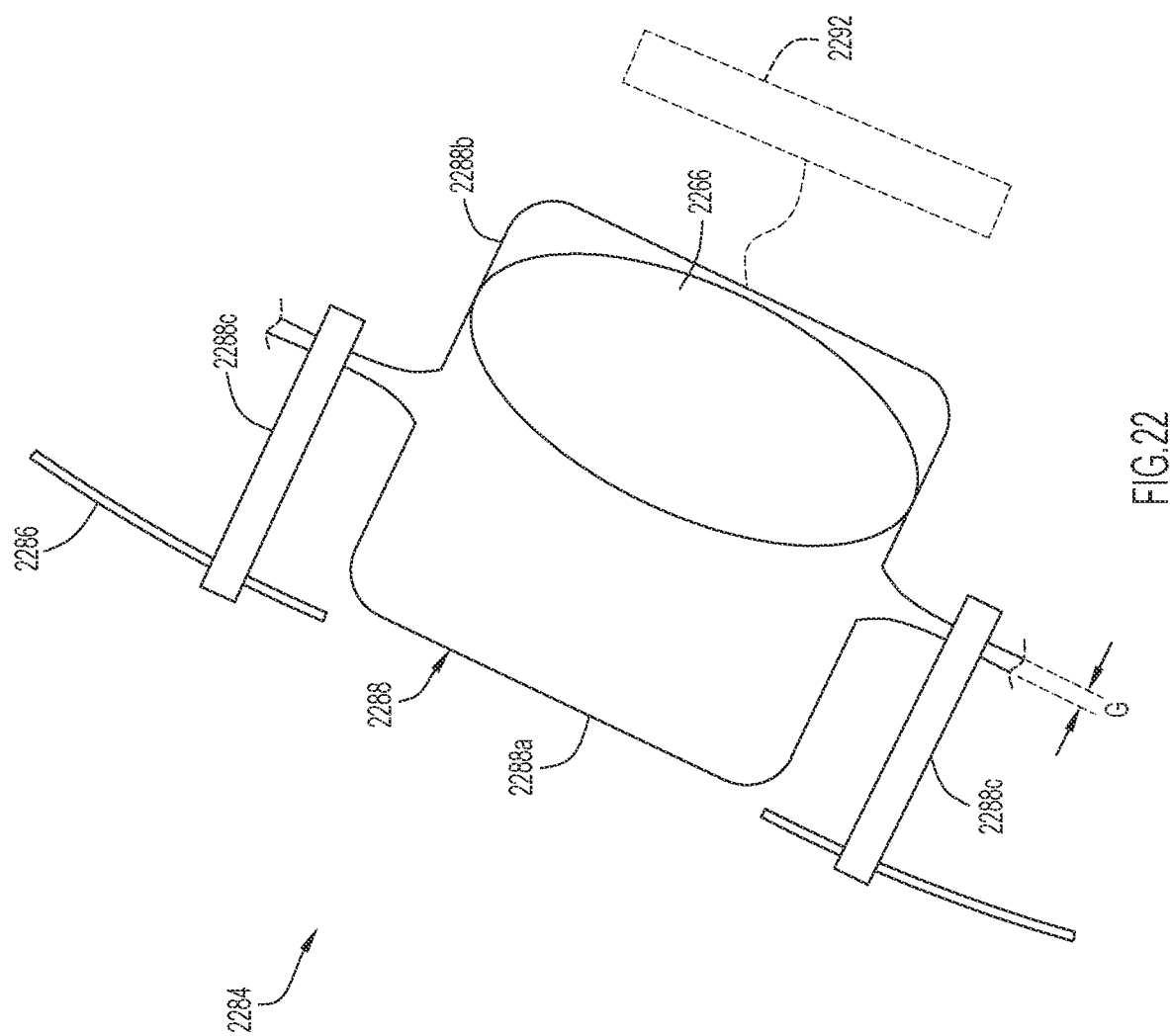
FIG. 22 is a diagrammatic side-view cross-sectional representation of an airbag mounting configuration for an autonomous vehicle that includes a second cradle mounting arrangement to mount an airbag cradle to a front panel or cap in accordance with an embodiment.

FIG. 22 is a diagrammatic side-view cross-sectional representation of an airbag mounting configuration that includes a second cradle mounting arrangement to mount an airbag cradle to a front panel or cap in accordance with an embodiment. An airbag mounting configuration 2284 includes an external vehicle panel 2286, an airbag cradle arrangement 2288, an airbag 2266, and a compliance arrangement 2292 which may be coupled to airbag cradle arrangement 2288.

Airbag cradle arrangement 2288 includes a top or cover portion 2288a, a bottom or bucket portion 2288b, and coupling arrangements 2288c Coupling arrangements 2288c may include clips, e.g., hooks and windows, which substantially enable cover portion 2288a and to bucket portion 2288b to be attached such that a gap 'G' is present between cover portion 2288a and bucket portion 2288b. In some instances, coupling arrangements 2288c may extend through the external vehicle panel (e.g., having a head portion that lays against an external surface or side of the external vehicle panel 2286). Gap G may represent an available stroke which allows top portion 2288a to effectively move. Coupling arrangements 2288c, which may be substantially rigid, may be substantially attached to an internal surface of panel 2286 and/or may extend through panel 2286 using any suitable method.

Thus, a compliance arrangement can be configured to interface with the bucket portion of a cradle (e.g., via a compliance component) and at least one mounting surface of at least one mounting component of a mounting arrangement for the vehicle and a gap can be provided between the cover portion and the bucket portion of a cradle via one or more coupling or bracket arrangements such that the gap allows the cover portion to move independently of the bucket portion. The presence of such a gap may allow for the bucket portion to be reaction-force bearing, and to remain substantially rigid as the cover portion translates upon the deployment of an airbag.

Figure 23:
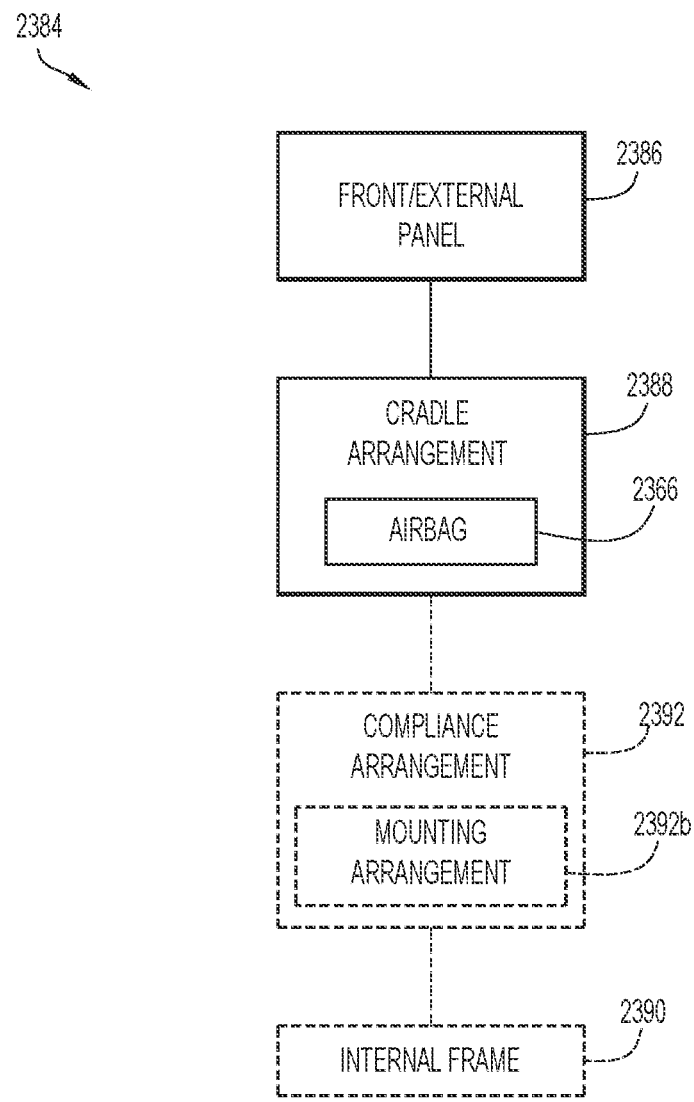
FIG. 23 is a diagrammatic representation of an airbag mounting configuration for an autonomous vehicle in accordance with an embodiment.

FIG. 23 is a diagrammatic representation of an airbag mounting configuration in accordance with an embodiment. An airbag mounting configuration 2384 includes a front or external panel 2386 of a vehicle and a cradle arrangement 2388 that is coupled to, affixed, or otherwise attached to, front or external panel 2386. Cradle arrangement 2388 is arranged to contain at least one airbag 2366, for example, at least one airbag 2366 (undeployed) may be contained in cradle arrangement 2388.

Airbag mounting configuration 2384 may optionally include a compliance arrangement 2392, which may include one or more compliance components (not shown) and a mounting arrangement 2392b including one or more mounting components (not shown). Mounting arrangement 2392b can be coupled to, affixed, or otherwise attached (statically or dynamically) to an internal frame 2390 of an autonomous vehicle. Compliance arrangement 2392 can be coupled to or interface with cradle arrangement 2388 and can be arranged to absorb forces or energy associated with the deployment of at least one airbag 2366 and the contact of the at least one airbag 2366, when deployed, with a human and/or non-human object. Compliance arrangement 2392 can be generally attached or coupled to the internal frame 2390 via mounting arrangement 2392b in some embodiments. Internal frame 2390 may be part of a chassis of the autonomous vehicle.

Although only a few embodiments have been described in this disclosure, it should be understood that the disclosure may be embodied in many other specific forms without departing from the spirit or the scope of the present disclosure. By way of example, the configuration of a cradle or bucket arrangement that supports an airbag may vary widely, and mechanisms and/or methods used to substantially couple a compliance arrangement to the cradle may vary widely. Suitable mechanisms for coupling a compliance arrangement or member to a cradle may include, but are not limited to including, adhesives, mechanical fasteners, magnetic fasteners, press-fit arrangements, combinations thereof, and/or the like.

A cradle that holds an airbag has generally been described as including two portions, e.g., a bottom or bucket portion in which an undeployed airbag may sit and a top or cover portion that is arranged to be positioned at least partially in an opening of a front panel. The top cover may be replaceable.

In one embodiment, when a bottom portion and a top portion of a cradle are effectively assembled together, there may be an air gap or a stroke between the portions. Such an air gap may be maintained by mechanisms including, but not limited to including, spacers and clips. The presence of such a gap may allow for the bottom portion to be reaction-force bearing, and to remain substantially rigid as the top portion translates upon the deployment of an airbag.

The number of airbags that may be deployed with respect to an exterior of a vehicle may vary widely. That is, a vehicle may carry more than two airbags that are arranged to be deployed with respect to an exterior of the vehicle. Further, airbags may be located substantially anywhere on a vehicle, and are not limited to being located on a front and/or a leading-edge surface of the vehicle.

In some embodiments, determining an appropriate airbag configuration involves determining the timing of a collision. Generally, an airbag may be at a substantially ideal operating pressure range for a relatively short period of time. Thus, in some instances, when a collision is predicted to occur too soon for one or more airbags to inflate such that an intended position or ideal operating pressure is reached prior to impact, the one or more airbags may not deploy. Alternatively, in some instances, an airbag may be deployed earlier to allow for the pressure in one or more airbags to drop, e.g., when a vehicle is about to come into contact with a smaller pedestrian.

A vehicle may include a single airbag that is to be deployed prior to a collision with a pedestrian, or approximately as a collision is occurring with a human and/or a non-human object. Such a single airbag may be located on a vehicle in a position that is determined to be most likely to impact an object as the vehicle drives. In one embodiment, a single airbag may be deployed at a time that allows a substantially desired pressure to be reached within the airbag just as a collision occurs.

Airbags may be arranged to include multiple chambers that are arranged to be individually inflated. Multi-chambered airbags on a vehicle may be configured such that when the vehicle is about to collide with an object, selected chambers of the airbags may be inflated or otherwise deployed. The one or more chambers to be inflated may essentially be selected based upon a height or other dimension of an object that is subject to a substantially unavoidable collision. In one embodiment, multiple multi-chambered airbags may be implemented without departing from the sprit or the scope of the disclosure. In another embodiment, a single multi-chambered airbag may be implemented such that each chamber may be individually inflated, and such that the configuration of chambers to inflate is determined based upon characteristics of a pedestrian that is subject to a substantially unavoidable collision.

While an inflator that deploys a first airbag may be actuated at substantially the same time as an inflator that deploys a second airbag, e.g., when both airbags are to be deployed in advance of a collision with an object, it should be understood that the inflators are not necessarily actuated at substantially the same time. In other words, inflators may be activated at different times.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

Figure 24:
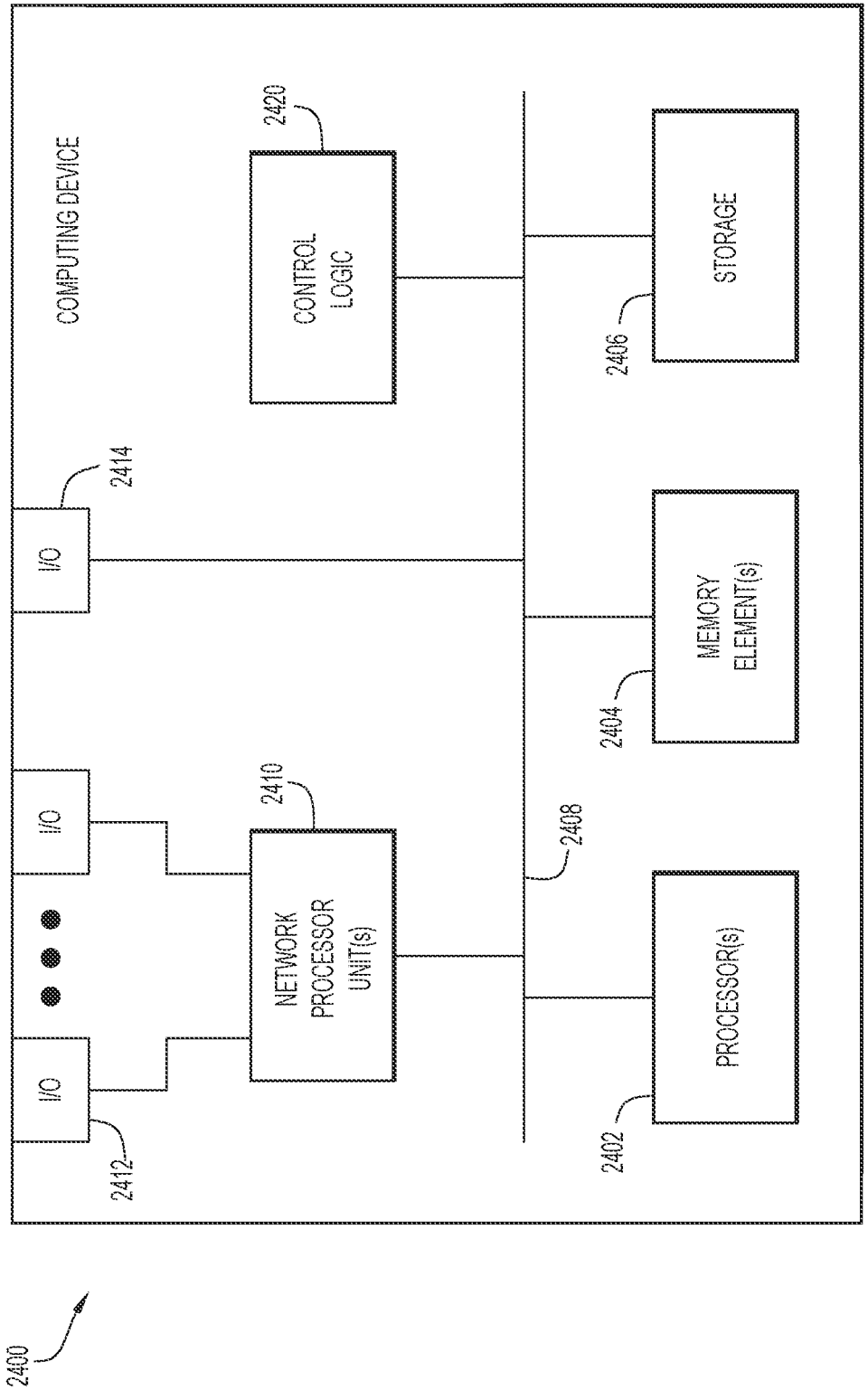
FIG. 24 is a hardware block diagram of a computing device for an autonomous vehicle that may perform functions associated with any combination of operations discussed for any techniques depicted herein.

FIG. 24 is a hardware block diagram of a computing device 2400 that may perform functions associated with any combination of operations discussed for any techniques depicted herein. In various example embodiments, a computing device, such as computing device 2400 or any combination of computing devices 2400, may be configured as any entity/entities as discussed for the techniques depicted herein, such as the airbag deployment system 450 or the collision analysis/prediction system 454, in order to perform operations of the various techniques discussed herein.

In at least one embodiment, computing device 2400 may include one or more processor(s) 2402, one or more memory element(s) 2404, storage 2406, a bus 2408, one or more network processor unit(s) 2410 interconnected with one or more network input/output (I/O) interface(s) 2412, one or more I/O interface(s) 2414, and control logic 2420. In various embodiments, instructions associated with logic for computing device 2400 can overlap in any manner and are not limited to the specific allocation of instructions and/or operations described herein.

In at least one embodiment, processor(s) 2402 is/are at least one hardware processor configured to execute various tasks, operations and/or functions for computing device 2400 as described herein according to software and/or instructions configured for computing device. Processor(s) 2402 (e.g., hardware processor(s)) can execute any type of instructions associated with data to achieve the operations detailed herein. In one example, processor(s) 2402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 2404 and/or storage 2406 is/are configured to store data, information, software, and/or instructions associated with computing device 2400, and/or logic configured for memory element(s) 2404 and/or storage 2406. For example, any logic described herein (e.g., control logic 2420) can, in various embodiments, be stored for computing device 2400 using any combination of memory element(s) 2404 and/or storage 2406. Note that in some embodiments, storage 2406 can be consolidated with memory element(s) 2404 (or vice versa), or can overlap/exist in any other suitable manner.

In at least one embodiment, bus 2408 can be configured as an interface that enables one or more elements of computing device 2400 to communicate in order to exchange information and/or data. Bus 2408 can be implemented with any architecture designed for passing control, data and/or information between processors, memory elements/storage, peripheral devices, and/or any other hardware and/or software components that may be configured for computing device 2400. In at least one embodiment, bus 2408 may be implemented as a fast kernel-hosted interconnect, potentially using shared memory between processes (e.g., logic), which can enable efficient communication paths between the processes. In at least one embodiment, bus 2408 may be implemented as a Controller Area Network (CAN) bus.

In various embodiments, network processor unit(s) 2410 may enable communication between computing device 2400 and other systems, entities, etc. (e.g., for an autonomous vehicle), via network I/O interface(s) 2412 to facilitate operations discussed for various embodiments described herein. In various embodiments, network processor unit(s) 2410 can be configured as a combination of hardware and/or software, such as one or more Ethernet driver(s) and/or controller(s) or interface cards, CAN driver(s) and/or controllers, optical driver(s) and/or controller(s), and/or other similar network interface driver(s) and/or controller(s) now known or hereafter developed to enable communications between computing device 2400 and other systems, entities, etc. to facilitate operations for various embodiments described herein. In various embodiments, network I/O interface(s) 2412 can be configured as one or more Ethernet port(s), CAN ports, and/or any other I/O port(s) now known or hereafter developed. Thus, the network processor unit(s) 2410 and/or network I/O interfaces 2412 may include suitable interfaces for receiving, transmitting, and/or otherwise communicating data and/or information in a network/vehicular environment.

I/O interface(s) 2414 allow for input and output of data and/or information with other entities that may be connected to computing device 2400. For example, I/O interface(s) 2414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 2420 can include instructions that, when executed, cause processor(s) 2402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 2420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 2404 and/or storage 2406 can store data, software, code, instructions (e.g., processor instructions), logic, parameters, combinations thereof, and/or the like used for operations described herein. This includes memory element(s) 2404 and/or storage 2406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIGS. 3 and 4, may include hardware, firmware, and/or software embodied on a tangible medium. A tangible medium may be substantially any computer-readable medium that is capable of storing logic or computer program code that may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, with respect to FIG. 7, the steps of determining actuation parameters associated with one or more airbag(s) may occur in substantially any order, or simultaneously. Therefore, the present examples are to be considered as illustrative and not restrictive, and the examples are not to be limited to the details given herein, but may be modified within the scope of the appended claims.

In one form, a vehicle is provided comprising: an external panel comprising an internal side and an external side, wherein the internal side faces towards an interior of the vehicle and the external side faces away from the interior of the vehicle and wherein the external panel is formed of a deformable material; a cradle, wherein the cradle comprises a cover portion and a bucket portion and the cradle interfaces, at least in part, along the internal side of the external panel; and at least one airbag, wherein the bucket portion of the cradle supports the at least one airbag. In one instance for the vehicle, the cover portion of the cradle protrudes through the external panel.

In one instance the vehicle further includes a frame including an upper seal flange configured to interface with a top zone of the external panel via an upper seal and a lower seal flange configured to interface with a first front zone of the external panel via a lower seal, wherein the upper seal and the lower seal are formed of a material having a low strain rate during impact of at least one object external to the vehicle. In one instance for the vehicle, the external panel further comprises a upper compliance structure configured to interface with the upper seal and a lower compliance structure configured to interface with the lower seal and wherein the upper compliance structure and the lower compliance structure include one or more compliance features configured to cause the upper compliance structure and the lower compliance structure to deform upon an impact of the external panel with an object external to the vehicle.

In one instance for the vehicle, the external panel further comprises: one or more hinges configured along a top zone of the vehicle; one or more latch attachment portions configured along a first front zone of the vehicle; and one or more alignment portions configured to interface with one or more mounting components of a mounting arrangement of the vehicle.

In one instance for the vehicle, the cradle interfaces along the internal side of the external panel via a coupling or bracket arrangement that is affixed to the external panel. In one instance, the vehicle further comprises a compliance arrangement, wherein the compliance arrangement is configured to interface with the bucket portion of the cradle and at least one mounting surface of at least one mounting component of a mounting arrangement for the vehicle and wherein a gap is provided between the cover portion and the bucket portion of the cradle via the coupling or bracket arrangement to allow the cover portion to move independently of the bucket portion.

In one instance, the vehicle further comprises a frame; and a compliance arrangement comprising one or more compliance components and a mounting arrangement comprising one or more mounting components that provide mounting surfaces, wherein at least one compliance component is configured to interface with at least one mounting surface of at least one mounting component and wherein at least one mounting component is affixed to the frame.

In one instance, the bucket portion of the cradle interfaces with the at least one mounting surface via the at least one compliance component during at least one of deployment of the at least one airbag and impact with at least one object external to the vehicle. In at least one instance, at least one compliance component is configured to absorb reaction energy or force associated with at least one of deployment of the at least one airbag and impact with at least one object external to the vehicle. In at least one instance, at least one compliance component is at least one of: a tube attached to a mounting surface of a mounting component of the mounting arrangement, wherein the tube is configured to absorb the reaction energy or force; a bar component attached to a fold point component that is attached to a mounting surface of a mounting component of the mounting arrangement, wherein the bar component and the fold point component are configured to absorb the reaction energy or force; a strain-supporting component that is attached to one of a mounting surface of a mounting component of the mounting arrangement and the bucket portion of the cradle; and at least one strain-supporting component that is attached to the bucket portion of the cradle and at least one strain-supporting component that is attached to a mounting surface of a mounting component of the mounting arrangement.

In at least one instance, the strain supporting component that is attached to one of the mounting surface of the mounting component of the mounting arrangement and the bucket portion of the cradle or the at least one strain-supporting component that is attached to the bucket portion of the cradle and the at least one strain supporting component that is attached to the mounting surface of the mounting component of the mounting arrangement are formed of a material having a high strain rate during deployment of the at least one airbag and a low strain rate during an impact of at least one object external to the vehicle.

In one form an airbag mounting configuration is provided, comprising: a panel comprising an internal side and an external side, wherein the internal side faces towards an interior of an apparatus to which the panel is affixed and the external side faces away from the interior of the apparatus and wherein the panel is formed of a deformable material; a cradle, wherein the cradle comprises a cover portion and a bucket portion and interfaces, at least in part, along the internal side of the panel; and at least one airbag, wherein the bucket portion of the cradle supports the at least one airbag.

In at least one instance, the airbag mounting configuration further comprises a compliance arrangement comprising one or more compliance components and a mounting arrangement comprising one or more mounting components that provide mounting surfaces, wherein at least one compliance component is configured to interface with at least one mounting surface of at least one mounting component and wherein at least one mounting component is affixed to a frame of a vehicle.

In at least one instance for the airbag mounting configuration, at least one compliance component is affixed to the bucket portion of the cradle. In at least one instance for the airbag mounting configuration, at least one compliance component is affixed a mounting surface of at least one mounting component. In at least one instance for the airbag mounting configuration, at least one compliance component is configured to absorb reaction energy or force associated with at least one of deployment of the at least one airbag and impact with at least one object external to the vehicle.

In one form, a vehicle is providing comprising a panel comprising an internal side and an external side, wherein the internal side faces towards an interior of an apparatus to which the panel is affixed and the external side faces away from the interior of the apparatus and wherein the panel is formed of a deformable material; and an airbag cradle arrangement comprising: a cradle, wherein the cradle comprises a cover portion and a bucket portion; a bracket or coupling arrangement that attaches the cradle to the panel, wherein a gap is provided between the cover portion and the bucket portion of the cradle via the coupling or bracket arrangement to allow the cover portion to move independent of the bucket portion; and at least one airbag, wherein the bucket portion of the cradle supports the at least one airbag.

In one instance, the vehicle further comprises a frame; and a compliance arrangement comprising one or more compliance components and a mounting arrangement comprising one or more mounting components that provide mounting surfaces, wherein at least one compliance component is configured to interface with at least one mounting surface of at least one mounting component and wherein at least one mounting component is affixed to the frame.

VARIATIONS AND IMPLEMENTATIONS

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A vehicle comprising:
    an external panel comprising an internal side and an external side, wherein the internal side faces towards an interior of the vehicle and the external side faces away from the interior of the vehicle and wherein the external panel is formed of a deformable material;
    a cradle, wherein the cradle comprises a cover portion and a bucket portion and the cradle interfaces, at least in part, along the internal side of the external panel;
    at least one airbag, wherein the bucket portion of the cradle supports the at least one airbag; and
    a compliance arrangement comprising one or more compliance components that are configured to interface with the bucket portion of the cradle to facilitate compliant motion of at least the bucket portion of the cradle via the one or more compliance components for absorbing reaction energy or force responsive to at least one of deployment of the at least one airbag or impact of at least one external object with the at least one airbag.

2. The vehicle of claim 1, wherein the cover portion of the cradle protrudes through the external panel.

3. The vehicle of claim 1, wherein the external panel further comprises:
    one or more hinges configured along a top zone of the vehicle;
    one or more latch attachment portions configured along a first front zone of the vehicle; and
    one or more alignment portions configured to interface with one or more mounting components of a mounting arrangement of the vehicle.

4. The vehicle of claim 1, wherein the cradle interfaces along the internal side of the external panel via a coupling or bracket arrangement that is affixed to the external panel.

5. The vehicle of claim 4, further comprising:
    wherein the compliance arrangement is further configured to interface with at least one mounting surface of at least one mounting component of a mounting arrangement for the vehicle and wherein a gap is provided between the cover portion and the bucket portion of the cradle via the coupling or bracket arrangement to allow the cover portion to move independently of the bucket portion.

6. The vehicle of claim 1, further comprising:
    a frame, wherein the frame is configured to support the external panel; and
    a mounting arrangement comprising one or more mounting components that provide mounting surfaces, wherein at least one compliance component of the one or more compliance components of the compliance arrangement is configured to interface with at least one mounting surface of at least one mounting component of the one or more mounting components of the mounting arrangement and wherein at least one mounting component of the one or more mounting components of the mounting arrangement is affixed to the frame.

7. The vehicle of claim 6, wherein at least one compliance component of the one or more compliance components of the compliance arrangement is configured to attach to the bucket portion of the cradle and is also configured, during at least one of deployment of the at least one airbag and the impact with at least one object external to the vehicle, to interface with the at least one mounting surface of the at least one mounting component of the one or more mounting components of the mounting arrangement.

8. The vehicle of claim 6, wherein the at least one compliance component of the one or more compliance components of the compliance arrangement is a tube attached to the at least one mounting surface of the at least one mounting component of the one or more mounting components of the mounting arrangement, wherein the tube is configured to buckle for absorbing the reaction energy or force responsive to the at least one of the deployment of the at least one airbag or the impact of the at least one external object with the at least one airbag in order to facilitate the compliant motion of at least the bucket portion of the cradle.

9. The vehicle of claim 6, wherein the at least one compliance component of the one or more compliance components of the compliance arrangement is a bar component attached to a fold point component that is attached to the at least one mounting surface of the at least one mounting component of the one or more mounting components of the mounting arrangement, wherein the bar component and the fold point component are configured to buckle for absorbing the reaction energy or force responsive to the at least one of the deployment of the at least one airbag or the impact of the at least one external object with the at least one airbag in order to facilitate the compliant motion of at least the bucket portion of the cradle.

10. The vehicle of claim 6, wherein the at least one compliance component of the one or more compliance components of the compliance arrangement is a foam component that is attached to the at least one mounting surface of the at least one mounting component of the one or more mounting components of the mounting arrangement and is attached to the bucket portion of the cradle, wherein the foam component provides for absorbing the reaction energy or force responsive to the at least one of the deployment of the at least one airbag or the impact of the at least one external object with the at least one airbag in order to facilitate the compliant motion of at least the bucket portion of the cradle.

11. The vehicle of claim 6, wherein at least one compliance component of the one or more compliance components of the compliance arrangement is at least one of:
  a tube attached to a mounting surface of a mounting component of the one or more mounting components of the mounting arrangement, wherein the tube is configured to absorb the reaction energy or force;
  a bar component attached to a fold point component that is attached to a mounting surface of a mounting component of the one or more mounting components of the mounting arrangement, wherein the bar component and the fold point component are configured to absorb the reaction energy or force;
  a strain-supporting component that is attached to a mounting surface of a mounting component of the one or more mounting components of the mounting arrangement and the bucket portion of the cradle; and
  at least one strain-supporting component that is attached to the bucket portion of the cradle and is not attached to a mounting surface of a mounting component of the one or more mounting components of the mounting arrangement and at least one strain-supporting component that is attached to the mounting surface of the mounting component of the one or more mounting components of the mounting arrangement.

12. The vehicle of claim 11, wherein at least one of the strain-supporting component that is attached to the mounting surface of the mounting component of the one or more mounting components of the mounting arrangement and the bucket portion of the cradle or the at least one strain-supporting component that is attached to the bucket portion of the cradle and is not attached to the mounting surface of the mounting component of the one or more mounting components of the mounting arrangement and the at least one strain-supporting component that is attached to the mounting surface of the mounting component of the one or more mounting components of the mounting arrangement are formed of a foam material having a high strain rate during deployment of the at least one airbag and a low strain rate during an impact of at least one object external to the vehicle.

13. An airbag mounting configuration comprising:
  a panel comprising an internal side and an external side, wherein the internal side faces towards an interior of an apparatus to which the panel is affixed and the external side faces away from the interior of the apparatus and wherein the panel is formed of a deformable material;
  a cradle, wherein the cradle comprises a cover portion and a bucket portion and interfaces, at least in part, along the internal side of the panel;
  at least one airbag, wherein the bucket portion of the cradle supports the at least one airbag; and
  a compliance arrangement comprising one or more compliance components that are configured to interface with the bucket portion of the cradle to facilitate compliant motion of at least the bucket portion of the cradle via the one or more compliance components for absorbing reaction energy or force responsive to at least one of deployment of the at least one airbag or impact of at least one external object with the at least one airbag.

14. The airbag mounting configuration of claim 13, wherein the cover portion of the cradle protrudes through the panel.

15. The airbag mounting configuration of claim 13, wherein the cradle interfaces along the internal side of the panel via a coupling or bracket arrangement that is affixed to the panel.

16. The airbag mounting configuration of claim 13, further comprising:
  a mounting arrangement comprising one or more mounting components that provide mounting surfaces, wherein at least one compliance component of the one or more compliance components of the compliance arrangement is configured to interface with at least one mounting surface of at least one mounting component of the one or more mounting components of the mounting arrangement and wherein the at least one mounting component of the one or more mounting components of the mounting arrangement is affixed to a frame of a vehicle.

17. The airbag mounting configuration of claim 16, wherein at least one compliance component of the one or more compliance components of the compliance arrangement is affixed to a mounting surface of at least one mounting component of the one or more mounting components of the mounting arrangement.

18. A vehicle comprising:
  a panel comprising an internal side and an external side, wherein the internal side faces towards an interior of an apparatus to which the panel is affixed and the external side faces away from the interior of the apparatus and wherein the panel is formed of a deformable material;
  an airbag cradle arrangement comprising:
    a cradle, wherein the cradle comprises a cover portion and a bucket portion;
    a bracket or coupling arrangement that attaches the cradle to the panel, wherein a gap is provided between the cover portion and the bucket portion of the cradle via the bracket or coupling arrangement to allow the cover portion to move independent of the bucket portion; and
    at least one airbag, wherein the bucket portion of the cradle supports the at least one airbag; and
  a compliance arrangement comprising one or more compliance components that are configured to interface with the bucket portion of the cradle to facilitate compliant motion of at least the bucket portion of the cradle via the one or more compliance components for absorbing reaction energy or force responsive to at least one of deployment of the at least one airbag or impact of at least one external object with the at least one airbag.

19. The vehicle of claim 18, further comprising:
a frame; and
a mounting arrangement comprising one or more mounting components that provide mounting surfaces, wherein at least one compliance component of the one or more compliance components of the compliance arrangement is configured to interface with at least one mounting surface of at least one mounting component of the one or more mounting components of the mounting arrangement and wherein the at least one mounting component of the one or more mounting components of the mounting arrangement is affixed to the frame.

20. The vehicle of claim 19, wherein the at least one compliance component of the one or more compliance components of the compliance arrangement is at least one of:
a tube attached to a mounting surface of a mounting component of the one or more mounting components of the mounting arrangement, wherein the tube is configured to absorb the reaction energy or force;
a bar component attached to a fold point component that is attached to a mounting surface of a mounting component of the one or more mounting components of the mounting arrangement, wherein the bar component and the fold point component are configured to absorb the reaction energy or force;
a strain-supporting component that is attached to one of a mounting surface of a mounting component of the one or more mounting components of the mounting arrangement and the bucket portion of the cradle; and
at least one strain-supporting component that is attached to the bucket portion of the cradle and is not attached to a mounting surface of a mounting component of the one or more mounting components of the mounting arrangement and at least one strain-supporting component that is attached to the mounting surface of the mounting component of the one or more mounting components of the mounting arrangement.

* * * * *